United States Patent
Stratakos et al.

(10) Patent No.: US 9,966,899 B2
(45) Date of Patent: May 8, 2018

(54) SYSTEMS AND METHODS FOR CONTROLLING MAXIMUM POWER POINT TRACKING CONTROLLERS

(71) Applicant: Volterra Semiconductor LLC, San Jose, CA (US)

(72) Inventors: Anthony J. Stratakos, Kentfield, CA (US); Michael D. McJimsey, Danville, CA (US); Ilija Jergovic, Palo Alto, CA (US); Kaiwei Yao, San Jose, CA (US); Xin Zhang, San Jose, CA (US); Vincent W. Ng, Milpitas, CA (US)

(73) Assignee: Volterra Semiconductor, LLC, San Jose, CA (US)

( * ) Notice: Subject to any disclaimer, the term of this patent is extended or adjusted under 35 U.S.C. 154(b) by 0 days. days.

(21) Appl. No.: 15/418,962

(22) Filed: Jan. 30, 2017

(65) Prior Publication Data

US 2017/0141725 A1 May 18, 2017

Related U.S. Application Data

(62) Division of application No. 13/653,389, filed on Oct. 16, 2012, now Pat. No. 9,557,758.

(51) Int. Cl.
*H02S 50/10* (2014.01)
*H02J 3/38* (2006.01)

(52) U.S. Cl.
CPC .............. *H02S 50/10* (2014.12); *H02J 3/385* (2013.01)

(58) Field of Classification Search
CPC .... H02M 3/156; H02M 3/158; H02M 3/1582; H02M 3/1588; Y02B 70/1466
See application file for complete search history.

(56) References Cited

U.S. PATENT DOCUMENTS

| | | | |
|---|---|---|---|
| 6,020,729 A | 2/2000 | Stratakos et al. |
| 6,160,441 A | 12/2000 | Stratakos et al. |
| 6,225,795 B1 | 5/2001 | Stratakos et al. |
| 6,262,558 B1 | 7/2001 | Weinberg |
| 6,362,986 B1 | 3/2002 | Schultz et al. |
| 6,445,244 B1 | 9/2002 | Stratakos et al. |
| 6,844,739 B2 | 1/2005 | Kasai et al. |

(Continued)

FOREIGN PATENT DOCUMENTS

JP H11-103538 A 4/1999
KR 10-2012-0075970 A 7/2012

OTHER PUBLICATIONS

Walker et al. (2004) "Cascaded DC-DC Converter Connection of Photovoltaic Modules," IEEE Trans. on Power Electronics. 19(4):1130-1139.

(Continued)

*Primary Examiner* — Timothy J Dole
*Assistant Examiner* — Monica Mata
(74) *Attorney, Agent, or Firm* — Lathrop Gage LLP

(57) ABSTRACT

A method for testing a photovoltaic device electrically coupled to an input port of a maximum power point tracking (MPPT) controller, where the MPPT controller includes a switching circuit adapted to transfer power between the input port and an output port of the MPPT controller, includes the steps of: (a) driving a test current into the output port of the MPPT controller; (b) detecting presence of the test current; and (c) in response to detecting presence of the test current, causing the switching circuit to provide a path for the test current from the output port to the photovoltaic device.

8 Claims, 14 Drawing Sheets

(56) References Cited

U.S. PATENT DOCUMENTS

| | | |
|---|---|---|
| 6,979,987 B2 | 12/2005 | Kernahan et al. |
| 8,158,877 B2 | 4/2012 | Klein et al. |
| 8,184,460 B2 | 5/2012 | O'Brien et al. |
| 2008/0236648 A1 | 10/2008 | Klein et al. |
| 2008/0303503 A1 | 12/2008 | Wolfs |
| 2009/0283128 A1 | 11/2009 | Zhang et al. |
| 2009/0284078 A1 | 11/2009 | Zhang et al. |
| 2009/0284232 A1 | 11/2009 | Zhang et al. |
| 2009/0284240 A1 | 11/2009 | Zhang et al. |
| 2009/0284998 A1 | 11/2009 | Zhang et al. |
| 2010/0207455 A1 | 8/2010 | Erickson, Jr. et al. |
| 2011/0062784 A1 | 3/2011 | Wolfs |
| 2011/0285375 A1 | 11/2011 | Deboy |
| 2012/0043818 A1 | 2/2012 | Stratakos et al. |
| 2012/0043823 A1 | 2/2012 | Stratakos et al. |
| 2012/0043923 A1 | 2/2012 | Ikriannikov et al. |
| 2012/0044014 A1 | 2/2012 | Stratakos et al. |
| 2012/0081933 A1 | 4/2012 | Garrity |
| 2012/0169240 A1 | 7/2012 | MacFarlane |
| 2013/0106194 A1 | 5/2013 | Jergovic et al. |

OTHER PUBLICATIONS

Wolfs et al. (2004) "Distributed Maximum Power Tracking for High Performance Vehicle Solar Arrays," AUPEC 2004, Sep. 2004. 6 pages.

Wolfs et al. (2005) "A Single Cell Maximum Power Point Tracking Converter without a Current Sensor for High Performance Vehicle Solar Arrays," PESC 2005, Jun. 2005, 1 page.

International Search Report with Written Opinion corresponding to International Patent Application No. PCT/US2012/060469, dated Apr. 19, 2013, 9 pages.

SYSTEMS AND METHODS FOR CONTROLLING MAXIMUM POWER POINT TRACKING CONTROLLERS

RELATED APPLICATIONS

This application is a divisional of U.S. patent application Ser. No. 13/653,389, filed Oct. 16, 2012, which is incorporated herein by reference.

BACKGROUND

Photovoltaic cells produce a voltage that varies with current, cell operating condition, cell physics, cell defects, and cell illumination. One mathematical model for a photovoltaic cell, as illustrated in FIG. 1, models output current as:

$$I = I_L - I_0 \left\{ \exp\left[\frac{q(V + IR_S)}{nkT}\right] - 1 \right\} - \frac{V + IR_S}{R_{SH}} \quad \text{EQN. 1}$$

Where
$I_L$=photogenerated current
$R_S$=series resistance
$R_{SH}$=shunt resistance
$I_0$=reverse saturation current
n=diode ideality factor (1 for an ideal diode)
q=elementary charge
k=Boltzmann's constant
T=absolute temperature
I=output current at cell terminals
V=voltage at cell terminals
For silicon at 25° C., kT/q=0.0259 Volts.

Typical cell output voltages are low and depend on the band gap of the material used to manufacture the cell. Cell output voltages may be merely half a volt for silicon cells, far below the voltage needed to charge batteries or drive most other loads. Because of these low voltages, cells are typically connected together in series to form a module, or an array, having an output voltage much higher than that produced by a single cell. Additionally, two or more strings of multiple photovoltaic cells are sometimes electrically coupled in parallel to increase capacity.

Real-world photovoltaic cells often have one or more microscopic defects. These cell defects may cause mismatches of series resistance $R_S$, shunt resistance $R_{SH}$, and photogenerated current $I_L$ from cell to cell in a module. Further, cell illumination may vary from cell to cell in a system of photovoltaic cells, and may vary even from cell to cell in a module, for reasons including shadows cast by trees, bird droppings shadowing portions of a cell or module, dust, dirt, and other effects. These mismatches in illumination may vary from day to day and with time of day—a shadow may shift across a module during a day, and rain may wash away dust or dirt shadowing a cell.

From EQN. 1, output voltage is greatest at zero output current, and output voltage V falls off nonlinearly with increasing output current I. FIG. 2 illustrates the effect of increasing current drawn from a photovoltaic device at constant illumination. As current I is increased under constant illumination, voltage V falls off slowly, but as current I is increased to an output current near the photocurrent $I_L$, output voltage V falls off sharply. Similarly, cell power, the product of current and voltage, increases as current I increases, until falling voltage V overcomes the effect of increasing current, whereupon further increases in current I drawn from the cell cause power P to decrease rapidly. For a given illumination, each cell, module, and array of cells and modules therefore has a maximum power point (MPP) representing the voltage and current combination at which output power from the device is maximized. The MPP of a cell, module, or array will change as temperature and illumination, and hence photo-generated current $I_L$, changes. The MPP of a cell, module, or array may also be affected by factors such as shadowing and/or aging of the cell, module, or array.

Maximum Power Point Tracking (MPPT) controllers for operating a photovoltaic device at or near its maximum power point have been proposed. These controllers typically determine an MPP voltage and current for a photovoltaic device connected to their input, and adjust their effective impedance to maintain the photovoltaic device at the MPP.

Photovoltaic devices are typically subjected to one or more production line tests. For example, a photovoltaic device is often characterized using a "flash test," where the device is exposed to light of known intensity, such as a "1 sun" (1,000 watts per square meter) light source, while sweeping a load across the device from open circuit to short circuit, or vice versa. Voltage and current data is recorded during the load sweep, and device open circuit voltage (Voc), short circuit current (Isc), and maximum power point (Pmp) are determined from the recorded data. These device characteristics are used, for instance, to ensure device quality and/or to bin devices according to Voc, Isc, and/or Pmp.

As another example, photovoltaic devices are often subject to "electroluminescence" (EL) testing at one or more times during device production. EL testing includes forcing a test current through the photovoltaic device in a direction opposite to that which current normally flows through the device, thereby causing the device to emit infrared light. The infrared light is imaged to detect device imperfections, such as device cracks, thereby helping ensure device quality.

A photovoltaic device may also be subject to reverse current, which is current flowing through the device in a direction opposite to that of normal operation. For example, consider a scenario where first and second strings of photovoltaic devices are electrically coupled in parallel, and each string includes multiple series-coupled photovoltaic devices. Forward current will flow through both strings if the strings have identical current-voltage characteristics, where a string's current-voltage characteristic depends on both its physical properties and its operating conditions. For example, consider a situation where the first string is exposed to strong sunlight and the second string is mostly shaded. This illumination difference will cause the first string to produce a larger photo-generated current than the second string, such that the strings have different current-voltage characteristics, potentially resulting in a reverse current flowing through the second string.

SUMMARY

In an embodiment, a method for operating a maximum power point tracking (MPPT) controller including a switching circuit adapted to transfer power between an input port and an output port includes the steps of: (a) in a first operating mode of the MPPT controller, causing a first switching device of the switching circuit to operate at a fixed duty cycle; and (b) in a second operating mode of the MPPT controller, causing a control switching device of the switching circuit to repeatedly switch between its conductive and non-conductive states to maximize an amount of power extracted from a photovoltaic device electrically coupled to the input port.

In an embodiment, a method for testing a photovoltaic device electrically coupled to an input port of a maximum power point tracking (MPPT) controller, where the MPPT controller includes a switching circuit adapted to transfer power between the input port and an output port of the MPPT controller, includes the steps of: (a) driving a test current into the output port of the MPPT controller; (b) detecting presence of the test current; and (c) in response to detecting presence of the test current, causing the switching circuit to provide a path for the test current from the output port to the photovoltaic device.

In an embodiment, a maximum power point tracking (MPPT) controller includes an input and an output port, a switching circuit adapted to transfer power between the input and output ports, and a control subsystem. The control subsystem is adapted to (a) cause a first switching device of the switching circuit to operate at a fixed duty cycle, in a first operating mode of the MPPT controller, and (b) cause a control switching device of the switching circuit to repeatedly switch between its conductive and non-conductive states to maximize an amount of electric power extracted from a photovoltaic device electrically coupled to the input port, in a second operating mode of the MPPT controller.

DETAILED DESCRIPTION OF THE EMBODIMENTS

As discussed above, an MPPT controller can be used to operate a photovoltaic device at or near its MPP. However, conventional MPPT controllers typically interfere with photovoltaic device production line testing. For example, conventional MPPT controllers may impede a reverse test current and/or overheat if subjected to EL testing. As another example, transfer characteristics of conventional MPPT controllers will change during flash testing, thereby interfering with Voc, Isc, and Pmp determination. Accordingly, photovoltaic devices typically cannot be electrically coupled to conventional MPPT controllers during device production line testing.

This limitation of conventional MPPT controllers is a particularly serious drawback in applications where multiple MPPT controllers are co-packaged with multiple photovoltaic devices. In these applications, the MPPT controllers typically provide part of the interconnection between the photovoltaic devices. Thus, temporary connectors are required to interconnect the photovoltaic devices during production line testing, since the MPPT controllers cannot be present during the testing.

Additionally, conventional MPPT controllers may overheat or otherwise operate improperly when subject to reverse current. Accordingly, conventional MPPT controllers may not be suited for parallel coupled string applications.

Applicants have developed, however, MPPT controllers that partially or completely overcome one or more of the problems discussed above. These MPPT controllers include a fixed duty cycle operating mode, in addition to one or more other operating modes, thereby allowing the controllers to be used during one or more production line tests and/or with reverse current. For example, certain embodiments of the controllers support flash and/or EL testing. Accordingly, the new MPPT controllers described herein potentially simplify photovoltaic device production and testing, particularly in applications including a number of co-packaged photovoltaic devices and MPPT controllers.

Figure 3:
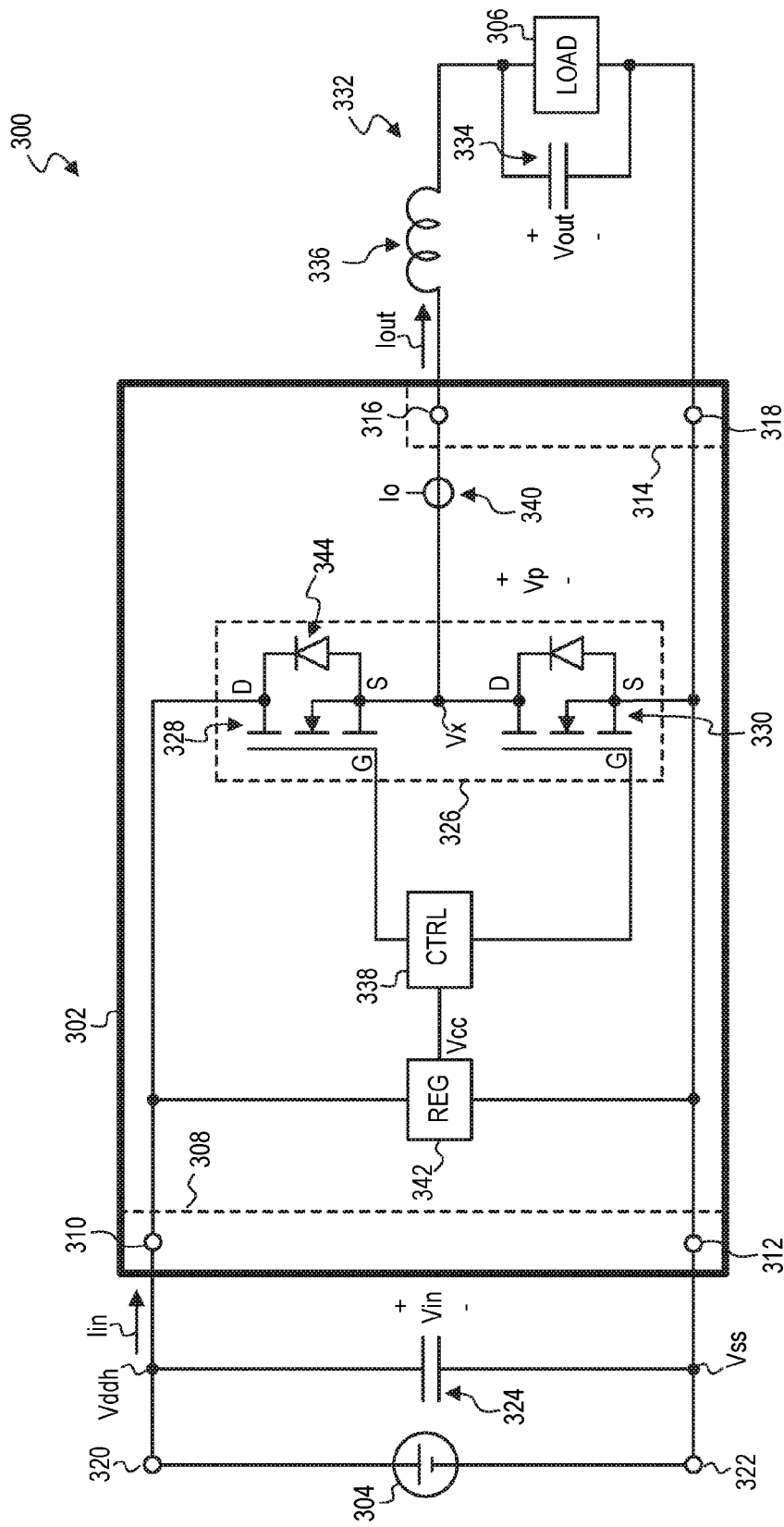
FIG. 3 illustrates a photovoltaic electric power system including a MPPT controller including at least two operating modes, according to an embodiment.

FIG. 3 illustrates an electric power system 300 including an MPPT controller 302 electrically coupled between a photovoltaic device 304 and a load 306. As discussed below, MPPT controller 302 supports at least a fixed duty cycle operating mode and an MPPT operating mode, thereby potentially allowing production line testing of photovoltaic device 304 with MPPT controller 302 electrically coupled thereto, as well as potentially supporting reverse current operation.

MPPT controller 302 includes an input port 308 including input terminals 310, 312 and an output port 314 including output terminals 316, 318. A positive terminal 320 of photovoltaic device 304 is electrically coupled to input terminal 310, and a negative terminal 322 of photovoltaic device 304 is electrically coupled to input terminal 312, such that photovoltaic device 304 is electrically coupled in series with input port 308. Terminals 310, 320 form part of a positive power node or rail (Vddh), and terminals 312, 322 form part of a reference power node or rail (Vss). Photovoltaic device 304 is, for example, a photovoltaic module including a plurality of interconnected photovoltaic cells, a single-junction photovoltaic cell, or a multi junction photovoltaic cell.

System 300 optionally includes one or more input capacitors 324 electrically coupled across input port 308. Capacitors 324 helps supply the ripple component of controller 302 input current Iin, thereby helping minimize the magnitude of ripple current flowing through photovoltaic device 304. Low ripple current magnitude through photovoltaic device 304, in turn, promotes efficient device operation. In certain embodiments where MPPT controller 302 switches at a relatively high frequency, such as at 500 kilohertz or greater, capacitors 324 are multilayer ceramic capacitors, to promote small capacitor size and long capacitor life.

MPPT controller 302 includes a switching circuit 326 electrically coupled across input port 308. Switching circuit 326 includes a control switching device 328 electrically coupled between input terminal 310 and a switching node Vx, and a freewheeling switching device 330 electrically coupled between switching node Vx and input terminal 312. Output terminal 316 is electrically coupled to switching node Vx, and output terminal 318 is electrically coupled to input terminal 312. In this document, a switching device includes, but is not limited to, a bipolar junction transistor, a field effect transistor (e.g., an N-channel or P-channel metal oxide semiconductor field effect transistor (MOSFET) such as a laterally diffused metal oxide semiconductor transistor (LDMOS), a junction field effect transistor, a metal semiconductor field effect transistor), an insulated gate bipolar junction transistor, a thyristor, or a silicon controlled rectifier. Although switching devices 328, 330 are shown as being N-channel enhancement mode field effect transistors, switching devices 328, 330 could be replaced with alternative switching devices without departing from the scope hereof.

Load 306 is electrically coupled in series with output port 314, to form part of an output circuit 332 electrically coupling load 306 to switching circuit 326. Load 306 includes, for example, an inverter or a battery charger. One or more output capacitors 334 are electrically coupled across load 306 to absorb the ripple component of output current Tout. Capacitors 334 are optionally omitted, though, in embodiments where load 306 includes significant capacitance, such as in embodiments where load 306 is an inverter with significant input capacitance. In certain embodiments where MPPT controller 302 switches at a relatively high frequency, such as at 500 kilohertz or greater, capacitors 334 are multilayer ceramic capacitors to promote small capacitor size and long capacitor life. Output circuit 332 includes energy storage inductance 336. In some embodiments, energy storage inductance 336 includes one or more discrete inductors, as symbolically shown in FIG. 3. However, in some other embodiments, discrete energy storage inductors are omitted, and "parasitic" interconnection inductance associated with a loop forming output circuit 332 serves as energy storage inductance 336.

MPPT controller 302 further includes a control subsystem 338. Switching circuit 326, energy storage inductance 336, and capacitors 334 collectively form a buck converter controlled by control subsystem 338. In an MPPT operating mode of controller 302, control subsystem 338 is adapted to control switching of switching circuit 326 such that the buck converter transfers power from input port 308 to output port 314, thereby transferring power from photovoltaic device 304 to load 306. Specifically, control subsystem 338 causes control switching device 328 to repeatedly switch between its conductive and non-conductive states, typically at a frequency of at least 100 kilohertz, to transfer power from input port 308 to output port 314. Switching device 328 is referred to as the "control" switching device because the ratio of input voltage Vin to output voltage Vout across load 306 is a function of switching device 328's duty cycle.

Control subsystem 338 also controls switching of freewheeling switching device 330 such that it performs a freewheeling function, or in other words, such that freewheeling switching device 330 provides a path for output current Tout flowing between output terminals 316, 318 when control switching device 328 is in its non-conductive state. In some alternate embodiments, freewheeling switching device 330 is replaced with an alternative freewheeling device, such as a diode with its anode electrically coupled to reference node Vss and its cathode electrically coupled to switching node Vx.

MPPT controller 302 optionally further includes a current reconstructor subsystem 340 adapted to generate a signal Io representing output current Tout flowing out of output port 314. In some embodiments, current reconstructor subsystem 340 employs systems and methods disclosed in one or more of U.S. Pat. Nos. 6,160,441 and 6,445,244 to Stratakos et al., each of which is incorporated herein by reference, to generate signal Io. However, current reconstructor subsystem 340 can be implemented in other manners without departing from the scope hereof. In some embodiments, signal Io is used for MPPT, to detect photovoltaic device 304 testing, and/or to detect reverse current, i.e., when output current Io has a negative value.

MPPT controller 302 optionally further includes a voltage regulator 342 which generates a "housekeeping" power supply node or rail (Vcc) from Vddh/Vss. Vcc is used, for example, to at least partially power control subsystem 338, as shown.

Although input capacitors 324, output capacitors 334, and energy storage inductance 336 are shown as being external to MPPT controller 302, one or more of these components could be integrated within controller 302 without departing from the scope hereof. Additionally, some or all of MPPT controller 302 is implemented in a common integrated circuit in certain embodiments, such as to promote small size, small parasitic impedance between components, and fast signal transfer time. In these embodiments, the integrated circuit is optionally co-packaged with photovoltaic device 304 to promote small system size and minimal impedance between device 304 and controller 302. However, MPPT controller 302 is not limited to an integrated circuit implementation and could instead be formed partially or completely from discrete components.

As discussed above, MPPT controller 302 has at least two operating modes, namely an MPPT operating mode and a fixed duty cycle operating mode. In the MPPT operating mode, control subsystem 338 causes control switching device 328 to repeatedly switch between its conductive and non-conductive states to at least substantially maximize an amount of power extracted from photovoltaic device 304 and delivered to load 306. For example, in some embodiments, control subsystem 338 maximizes power into input port 308, thereby maximizing power extracted from photovoltaic device 304. In some other embodiments, control subsystem 338 maximizes power out of output port 314, which effectively maximizes power extracted from photovoltaic device 304, since power out of output port 314 is the same as power into input port 308, neglecting losses in MDPT controller 302.

MPPT controller 302 may be configured to directly maximize input port or output port power in the MPPT operating mode. For example, in some embodiments, control subsystem 338 estimates input power from the product of input voltage Vin and input current Iin and controls switching circuit 326 operation to maximize input power. As another example, in some other embodiments, control subsystem 338 estimates output power from the product of output current Tout and output voltage Vout, or average value of switching node voltage Vp, and controls switching circuit 326 operation to maximize output power. However, MPPT controller 302 may alternately be configured to maximize input or output port power by maximizing a signal related to input port or output port power. For example, in a particular embodiment where output current Tout is essentially constant, controller 338 maximizes output port power by maximizing output voltage Vout, or an average value of switching node/output port voltage Vp.

In the fixed duty cycle operating mode, control subsystem 338 causes control switching device 328 to operate at a fixed duty cycle, to achieve a known direct current (DC) transformation between input port 308 and output port 314. In many embodiments, control subsystem 338 causes control switching device 328 to operate at large fixed duty cycle, such as ninety percent or one hundred percent duty cycle, to facilitate testing and to minimize losses, as discussed below. In the context of this document, "duty cycle" refers to the portion of each switching cycle that a switching device is operating in its conductive state. For example, consider a scenario where control switching device 328 switches between its conductive and non-conductive states at a frequency of 100 kilohertz, such that switching device 328 has a ten microsecond switching period. If control switching device 328 operates in its conductive state for nine microseconds of each switching period, control switching device 328 has a ninety percent duty cycle. If control switching device 328 continuously operates in its conductive state, control switching device 328 has a one hundred percent duty cycle.

Operating control switching device 328 at a fixed duty cycle facilitates determining Voc, Isc, and Pmp from measured Tout and Vout values during flash testing. In particular, MPPT controller 302 operates as a fixed DC transformer when control switching device 328 operates at a fixed duty cycle, such that the following relationships apply during continuous conduction mode operation, where D is duty cycle of control switching device 328:

$$Vout = D*Vin \qquad \text{EQN. 2}$$

$$Iout = Iin/D \qquad \text{EQN. 3}$$

Thus, photovoltaic device 304 voltage and current can be determined simply by scaling measured output voltage Vo and output current Io values by D, when operating with fixed duty cycle. In contrast, if MPPT controller 302 did not operate at a fixed duty cycle during flash testing, it would be difficult to determine photovoltaic device 304 voltage and current from measured Vo and Io values, since duty cycle would vary due to MPPT operation.

Additionally, operating control switching device 328 at a fixed duty cycle facilitates EL testing by enabling the magnitude of test current through photovoltaic device 304 to be readily determined. As discussed above, the ratio of controller input and output current is a function of duty cycle. Thus, the magnitude of EL test current through photovoltaic device 304 can be determined simply by scaling the magnitude of EL test current applied to output port 314, if duty cycle is fixed. In contrast, if MPPT controller 302 did not operate at a fixed duty cycle during EL testing, it would be difficult to determine the magnitude of photovoltaic device 304 current from current applied to output port 314, since duty cycle would vary due to MPPT operation.

Furthermore, operating control switching device 328 at a large duty facilitates flash and EL testing, as well as reverse current operation, by promoting low current magnitude. As can be determined from EQN. 3, controller output current magnitude is inversely proportional to controller input current magnitude. Thus, for a given input current magnitude, output current magnitude is minimized by operating at a large duty cycle, such as at least ninety percent duty cycle. Low output current magnitude, in turn, promotes low controller 302 losses, since losses in controller 302 generally increase with increasing output current magnitude. Low losses in controller 302 help minimize heating during flash testing, EL testing, and reverse current operation. Low losses in controller 302 also help minimize the magnitude of current required during flash and EL testing. Low controller 302 losses may be particularly important during EL testing, because EL testing typically requires a relatively high test current magnitude.

Although reverse current operation is generally discussed herein in conjunction with fixed duty cycle operation, it should be realized that duty cycle need not be fixed during reverse current operation, since a fixed DC transformation is not required. Instead, duty cycle just needs to be large, such as ninety percent or greater, to achieve low losses, as discussed above.

Figure 4:
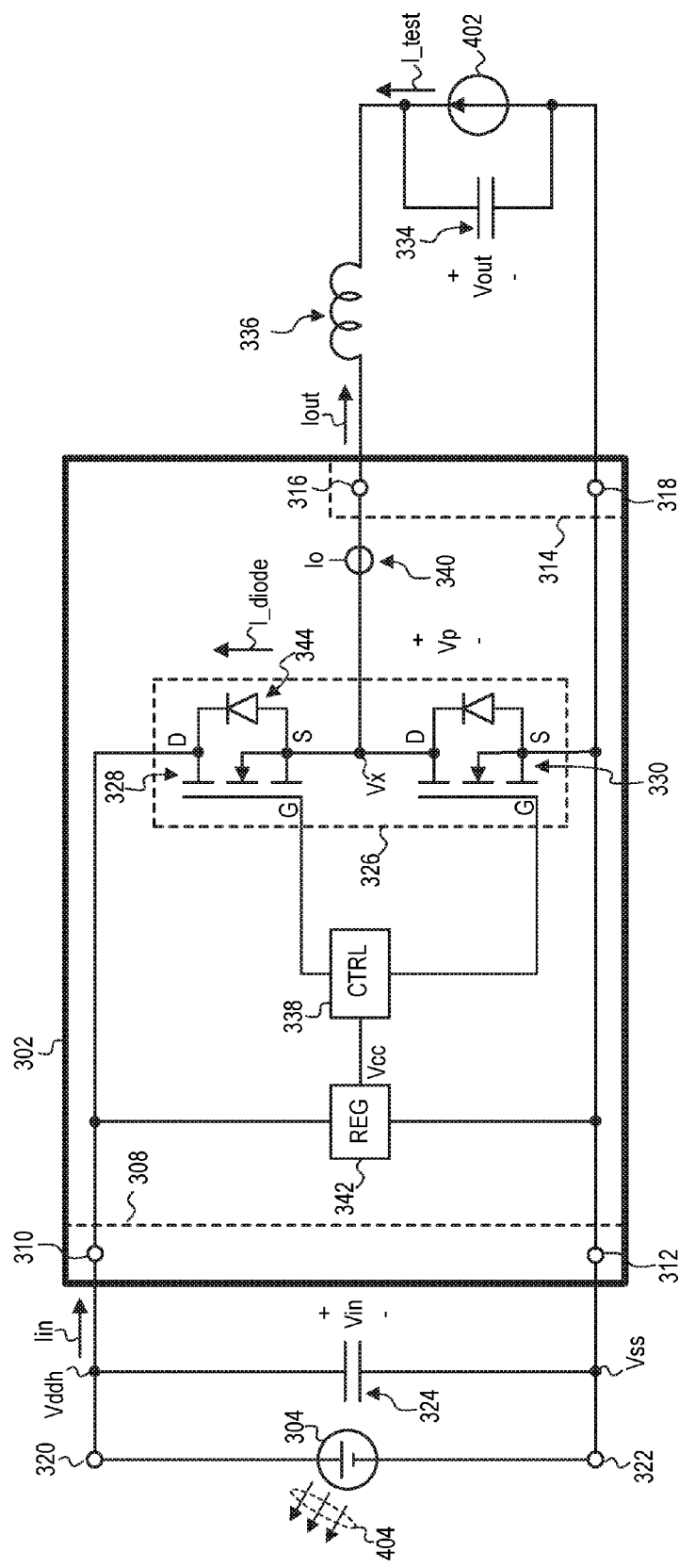
FIG. 4 illustrates EL testing of a photovoltaic device of the FIG. 3 electric power system, according to an embodiment.

FIG. 4 shows one example of EL testing photovoltaic device 304 with MPPT controller 302 electrically coupled thereto. A test current source 402 electrically coupled in series with output port 314 injects a test current I_test into output port 314. I_test is considered to be a "reverse" test current because it flows into output port 314 in a direction opposite of output current Iout during normal system operation. MPPT controller 302 operates in its fixed duty cycle mode wherein control subsystem 338 causes control switching device 328 to operate at a fixed duty cycle, and thereby provide a known DC transformation between input port 308 and output port 314. Current I_test flows through photovoltaic device 304 in a direction opposite of that of normal operation, causing photovoltaic device 304 to emit infrared light 404, which is imaged for device quality assurance purposes. In embodiments where energy storage inductance 336 is one or more discrete inductors, inductance 336 is optionally omitted during EL testing.

Figure 5:
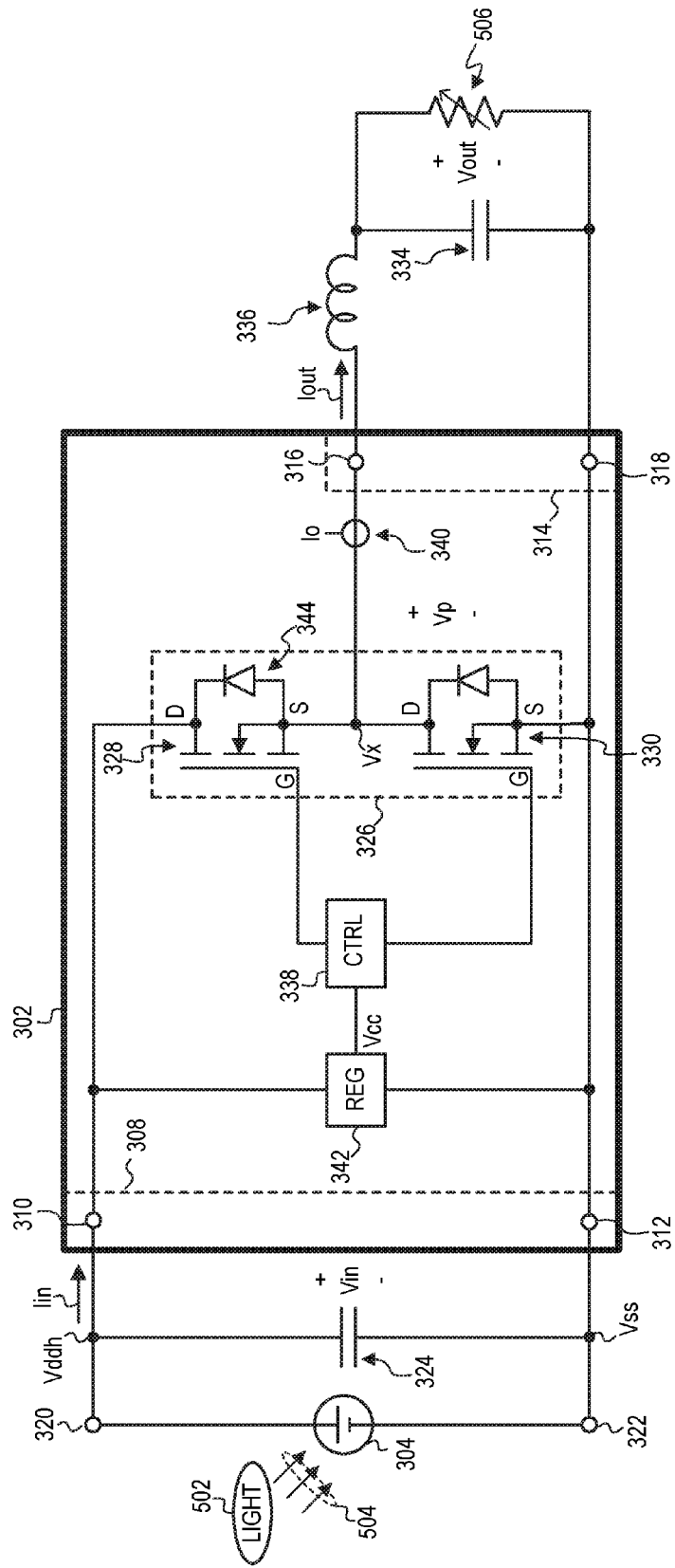
FIG. 5 illustrates flash testing of the photovoltaic device of the FIG. 3 electric power system, according to an embodiment.

FIG. 5 shows one example of flash testing photovoltaic device 304 with MPPT controller 302 electrically coupled thereto. A light source 502 projects light 504 of known intensity on photovoltaic device 304 while a load 506 is swept from an open circuit to a short circuit. Output voltage Vout and output current Iout are recorded during the load sweep, and these values are used to determine Voc, Isc, and Pmp of photovoltaic device 304. MPPT controller 302 operates in its fixed duty cycle mode during the flash test, such that control subsystem 338 causes control switching device 328 to switch at a fixed duty cycle. Operating control switching device 328 at a fixed duty cycle provides a known DC transformation between photovoltaic device 304 and load 506, thereby facilitating measurement of output current Iout during the load sweep. In embodiments where energy storage inductance 336 is one or more discrete inductors, inductance 336 is optionally omitted during flash testing.

Figure 6:
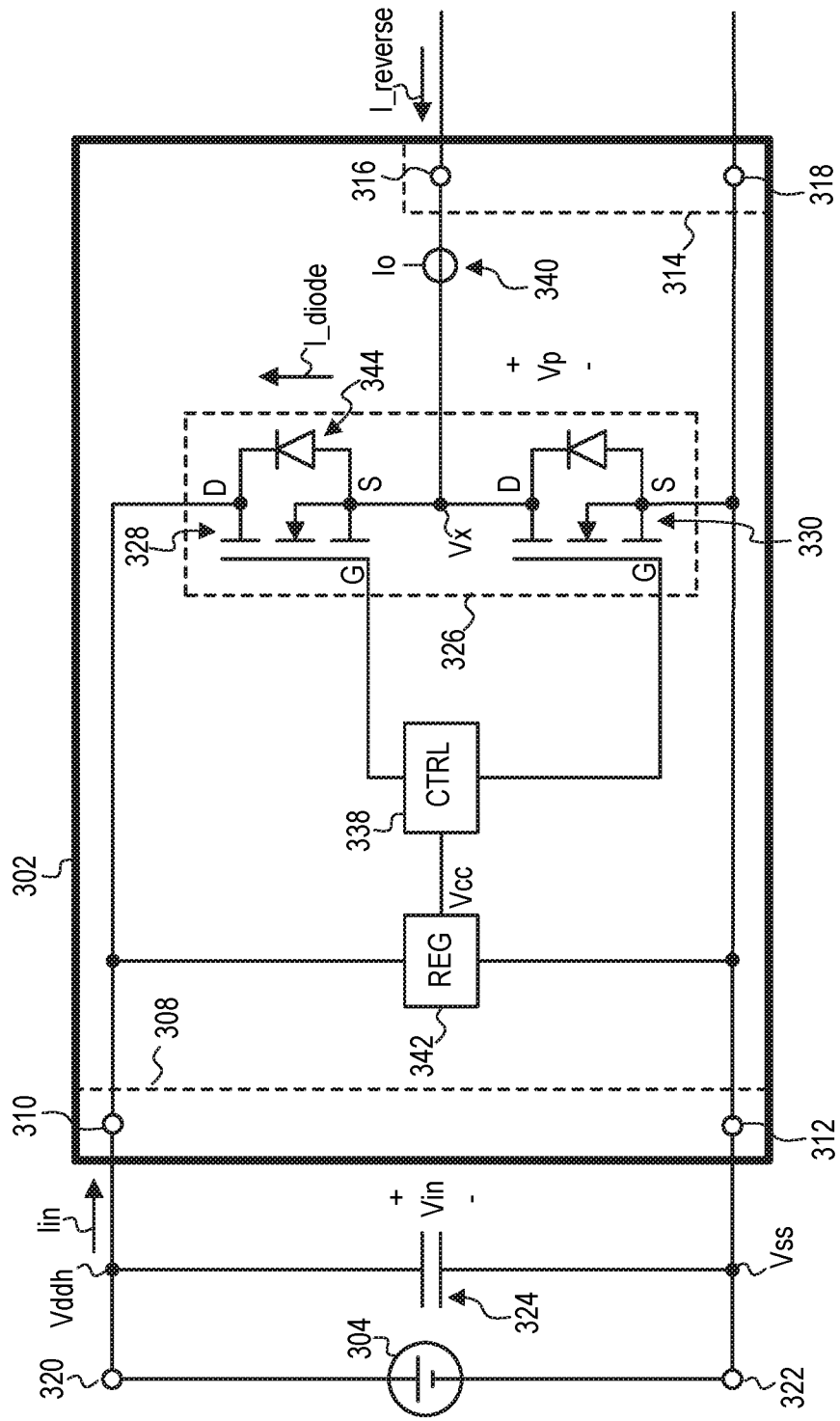
FIG. 6 illustrates reverse current operation of the photovoltaic device of the FIG. 3 electric power system, according to an embodiment.

FIG. 6 shows one example of reverse current operation of photovoltaic device 304 with MPPT controller 302 electrically coupled thereto. External circuitry (not shown), such as one or more parallel coupled photovoltaic devices, drives a reverse current I_reverse into output port 314. I_reverse is considered to be a "reverse" current because it flows into output port 314 in a direction opposite of output current Iout during normal system operation. MPPT controller 302 operates in its fixed duty cycle mode wherein control subsystem 338 causes control switching device 328 to operate at a large fixed duty cycle, and thereby provide a path for reverse current I_reverse to flow through photovoltaic device 304. As discussed above, a fixed duty cycle is not required for reverse current operation. Thus, in some alternate embodiments, control switching device 328 operates at a large, non-fixed duty cycle, such as ninety percent or greater, when conducting I_reverse.

Control subsystem 338 is optionally adapted to cause a duty cycle of control switching device 328 to ramp up to its fixed duty cycle when beginning to operate MPPT controller 302 in its fixed duty cycle operating mode, instead of immediately starting at the fixed duty cycle. Such control of duty cycle change, which is sometimes referred to as "soft starting," helps eliminate parasitic ringing associated with operating state changes.

In some embodiments, control subsystem 338 causes MPPT controller 302 to operate in its fixed duty cycle mode every time MPPT controller 302 starts-up. In some other embodiments, MPPT controller 302 operates in its fixed duty cycle mode in response to an external signal, such as a signal generated by test equipment configured to perform flash and/or EL testing. In certain embodiments, control subsystem 338 determines if fixed duty cycle mode operation is appropriate, and if so, operates controller 302 in its fixed duty cycle operating mode.

Figure 7:
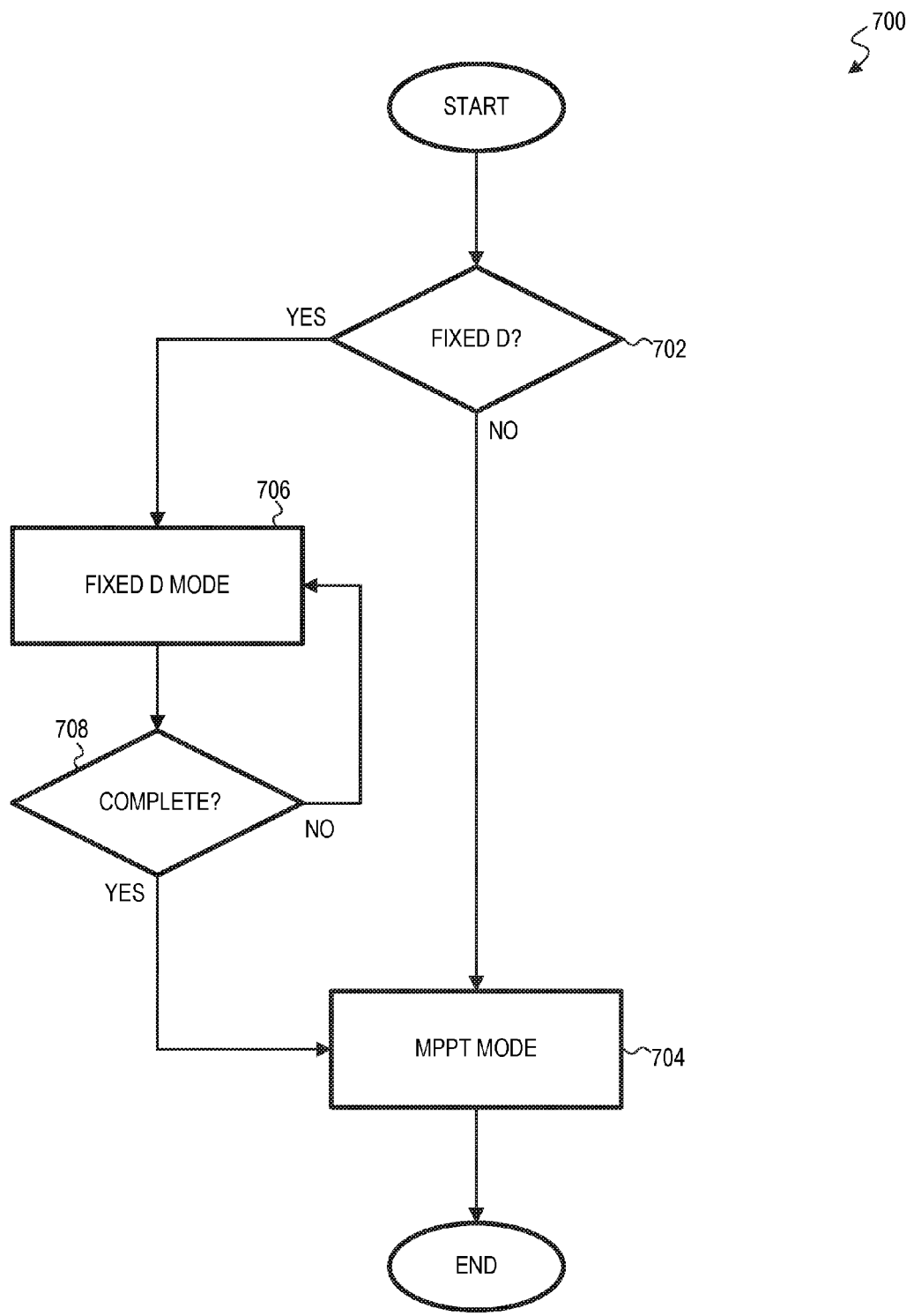
FIG. 7 illustrates one possible method of operating the MPPT controller of FIG. 3, according to an embodiment.

For example, FIG. 7 illustrate a method 700 of operating MPPT controller 302, which includes determining whether fixed duty cycle mode operation is appropriate. Method 700 is executed, for example, at start-up of MPPT controller 302 so that controller 302 starts-up in its fixed duty cycle mode, if appropriate. However, method 700 is not limited to use at controller 302 start-up and could instead be executed in other situations, such as after a fault condition.

Method 700 begins with a decision step 702 of determining if fixed duty cycle mode operation is appropriate. An example of step 702 is control subsystem 338 determining whether fixed duty cycle mode operation is appropriate. Some specific examples of step 702 are discussed below with respect to FIGS. 8 and 9. If decision step 702 determines that fixed duty cycle mode operation is not appropriate, method 700 proceeds to MPPT operating mode 704. An example of step 704 is control subsystem 338 operating MPPT controller 302 in its MPPT operating mode.

On the other hand, if decision step 702 determines that fixed duty cycle mode operation is appropriate, the method proceeds to fixed duty cycle mode operation step 706. One example of step 706 is control subsystem 338 causing control switching device 328 to operate at a fixed duty cycle of at least ninety percent. Decision step 708 determines whether fixed duty cycle mode operation is complete. If not, fixed duty cycle mode operation 706 continues. If fixed duty cycle mode operation is complete, the method proceeds to MPPT operating mode 704. An example of step 708 is control subsystem 338 determining whether fixed duty cycle mode operation is complete. Some specific examples of step 708 are discussed below with respect to FIGS. 10 and 11.

Method 700 could be modified to include one or additional operating modes in addition to MPPT mode 704 and fixed duty cycle mode 706. For example, some alternate embodiments further include a bypass operating mode where control switching device 328 operates in its non-conductive state and freewheeling switching device 330 operates in its conductive state. In these alternate embodiments, the bypass operating mode is entered, for example, from decision step 702 or 708 if fixed duty cycle mode operation is not appropriate or is complete, and input voltage Vin magnitude is too low to justify MPPT operation. Operation subsequently proceeds from the bypass mode to MPPT operation mode 704, for example, if Vin magnitude sufficiently rises to support MPPT operation.

Figure 8:
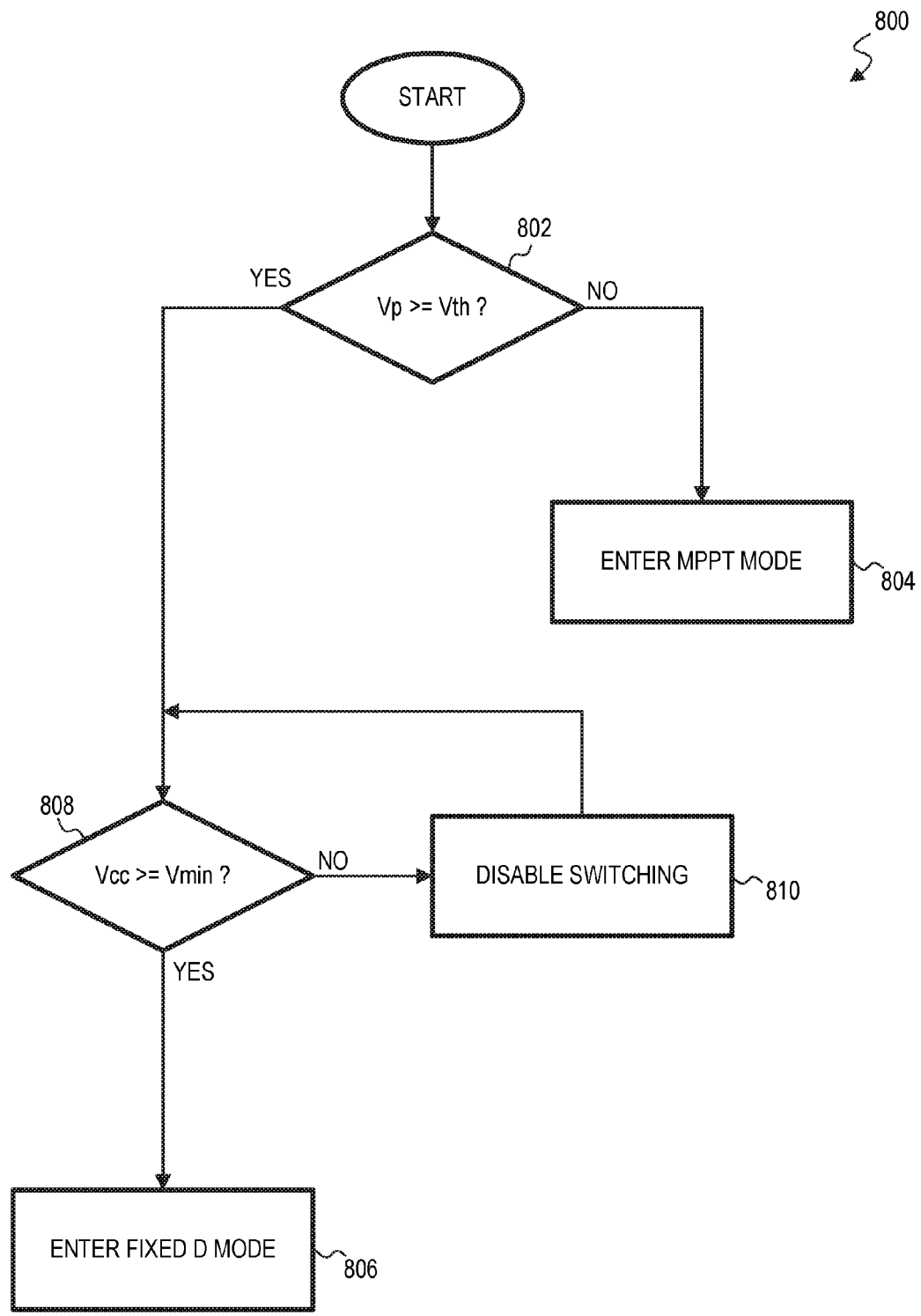
FIG. 8 illustrates one method of determining whether fixed duty cycle operating mode is appropriate, according to an embodiment.

In some embodiments, control subsystem 338 determines if fixed duty cycle mode operation is appropriate based on characteristics of its operating environment. For example, FIG. 8 illustrates a method 800 of determining whether fixed duty cycle operating mode is appropriate at start-up of a MPPT controller. Method 800 is executed, for example, as part of step 702 of method 700. However, method 800 is not limited to use with method 700, but instead could be used in other situations. Additionally, step 702 is not limited to use with method 800.

Method 800 begins with decision step 802 of detecting presence of an output port voltage prior to switching circuit operation at start-up, when switching circuit devices are in their non-conductive states. Presence of an output port voltage under these conditions indicates that the MPPT controller is being powered from its output port, instead of from its input port, thereby indicating possible presence of a test current and EL testing. For instance, consider the EL testing example of FIG. 4. In this example, test current source 402 causes voltage Vp to be present on output port 314 before switching circuit 326 begins to operate. In contrast, if source 402 was not present, output port voltage Vp would typically be essentially zero before switching circuit 326 operation, unless output port 314 was driven in some other manner. Accordingly, decision step 802 determines that fixed duty cycle mode operation is appropriate if the output port voltage magnitude is greater than a threshold value, where the threshold value is zero or a small positive value. One example of step 802 is control subsystem 338 comparing switching node or output port voltage Vp, or a signal representing Vp, to a threshold value and causing MPPT controller 302 to operate in its fixed duty cycle mode if Vp is greater than a threshold value, prior to switching circuit 326 operation at start-up, while switching devices 328, 330 are in their non-conductive states.

If decision step 802 determines that fixed duty cycle mode operation is not appropriate, method 800 proceeds to enter the MPPT mode at step 804. In some alternate embodiments, however, the method enters an alternative operating mode at step 804, such as the bypass mode described above, instead of the MPPT mode.

On the other hand, if decision step 802 determines that fixed duty cycle mode operation is appropriate, method 800 proceeds to enter the fixed duty cycle operating mode in step 806. However, some embodiments of method 800 include optional steps 808 and 810, as shown. These steps delay entrance into the fixed duty cycle operating mode until an MPPT controller power supply rail has reached a level necessary to support reliable controller operation.

In particular, decision step 808 compares a magnitude of a voltage on a controller power supply rail, such as magnitude of Vcc in controller 302, to a minimum value (Vmin) required for reliable MPPT controller operation. If the power supply rail voltage magnitude is greater than or equal to Vmin, the method proceeds to enter the fixed duty cycle operating mode in step 806. Otherwise, operation proceeds to step 810 where the switching circuit is disabled, such that its switching devices are in their non-conductive states. Method 800 returns to step 808 from step 810 such that the switching circuit remains disabled until the power supply rail voltage reaches Vmin. One example of steps 808 and 810 is control subsystem 338 causing switching devices 328, 330 to remain in their non-conductive states until Vcc reaches a minimum value required for reliable converter 302 operation.

Inclusion of optional steps 808 and 810 in method 800 may speed MPPT controller 302 start-up in some embodiments. For example, consider again the EL testing example of FIG. 4. The transistor implementing control switching device 328 includes a body diode 344, with an anode electrically coupled to switching node Vx and a cathode electrically coupled to input terminal 310. Accordingly, test current I_test flows through body diode 344, as represented by current I_diode in FIG. 4, into positive power rail Vddh, before switching circuit 326 is operational. The test current charges positive power supply rail Vddh. Additionally, the test current charges housekeeping power supply rail Vcc via positive power supply rail Vddh and regulator 342. Accordingly, power supply rails Vddh and Vcc are powered from output port 314 during EL testing, or during reverse current operation, in the fixed duty cycle mode. Delaying fixed duty cycle mode operation until Vcc reaches a minimum value required for reliable controller 302 operation promotes fast charging of the Vddh/Vcc rails and subsequent fixed duty cycle mode operation. On the other hand, if steps 808, 810 are omitted, freewheeling switching device 330 may conduct during charging of the Vddh/Vcc rails, thereby delaying rail charging and fixed duty cycle mode operation.

Figure 9:
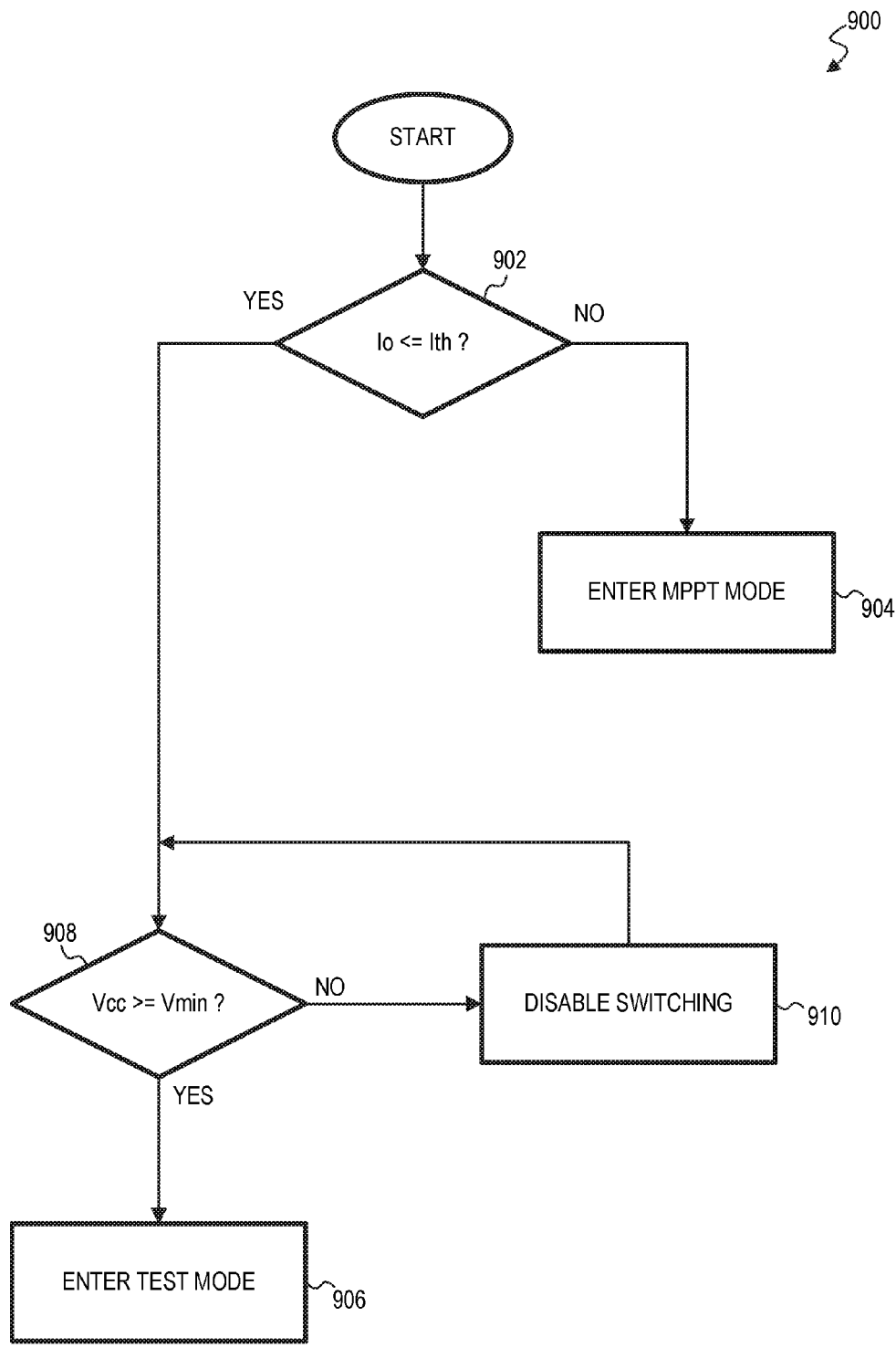
FIG. 9 illustrates another method of determining whether fixed duty cycle operating mode is appropriate, according to an embodiment.

FIG. 9 illustrates another method 900 of determining whether fixed duty cycle operating mode is appropriate. Method 900 is executed, for example, as part of step 702 of method 700. However, method 900 is not limited to use with method 700, but instead could be used in other situations. Additionally, step 702 is not limited to use with method 900.

Method 900 begins with step 902 of determining whether current flowing out of the MPPT controller's output port has a negative value, or in other words, whether current is flowing into the output port. Such condition represents possible driving of the converter with a test current and associated EL testing, or reverse current operation. For example, consider again the EL testing example of FIG. 4. During EL testing, test current source 402 drives test current I_test into output port 314, such that Iout has a negative value. As another example, consider the reverse current example of FIG. 6. External circuitry (not shown) drives reverse current I_reverse into output port 314, such that Iout has a negative value. Accordingly, fixed duty cycle mode operation is appropriate if output current value is less than a threshold value Ith, where Ith is zero or a value close to zero. Although step 902 is intended to detect when output current is negative, it may nevertheless be desirable to set Ith to a value other than zero, such as a value slightly below zero, to prevent erroneous fixed duty cycle mode triggering due to errors in measuring output current Iout. An example of step 902 is control subsystem 338 comparing signal Io representing current out of output port 314 to a threshold value, such as zero or a value close to zero, and determining that fixed duty cycle mode operation is appropriate if magnitude of Io is less than the threshold value.

If decision step 902 determines that fixed duty cycle mode operation is not appropriate, method 900 proceeds to enter the MPPT mode at step 904. In some alternate embodiments, however, the method enters an alternative operating mode at step 904, such as the bypass mode described above, instead of the MPPT mode.

On the other hand, if decision step 902 determines that fixed duty cycle mode operation is appropriate, method 900 proceeds to enter the fixed duty cycle operating mode in step 906. However, some embodiments of method 900 include optional steps 908 and 910, as shown. These steps, which are analogous to steps 808 and 810 of FIG. 8, delay entrance into the fixed duty cycle operating mode until an MPPT controller power supply rail has reached a level necessary to support reliable controller operation.

Figure 10:
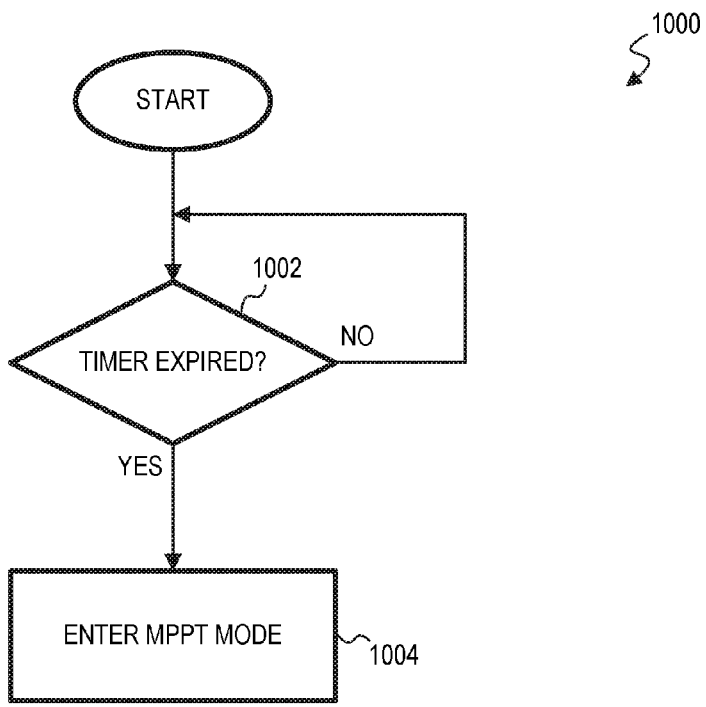
FIG. 10 illustrates one method of determining when to exit a fixed duty cycle operating mode, according to an embodiment.

FIG. 10 illustrates a method 1000 of determining when to exit the fixed duty cycle operating mode. Method 1000 is executed, for example, as part of step 708 of method 700. However, method 1000 is not limited to use with method 700, but instead could be used to determine when to exit the fixed duty cycle operating mode in other situations. Additionally, step 708 is not limited to use with method 1000.

Method 1000 begins with a decision step 1002 of determining whether a predetermined amount of time has expired. This predetermined amount of time is selected to allow sufficient time for applicable photovoltaic device tests, such as EL and flash testing, to be completed. If the predetermined amount of time has not expired, step 1002 repeats; otherwise, the method proceeds to enter MPPT mode in step 1004. An example of steps 1002, 1004 is control subsystem 338 starting a timer at a beginning of fixed duty cycle mode operation and entering MPPT mode after a predetermined amount of time has elapsed. In some alternate embodiments, however, the method enters an alternative operating mode at step 1004, such as the bypass mode described above, instead of the MPPT mode.

Figure 11:
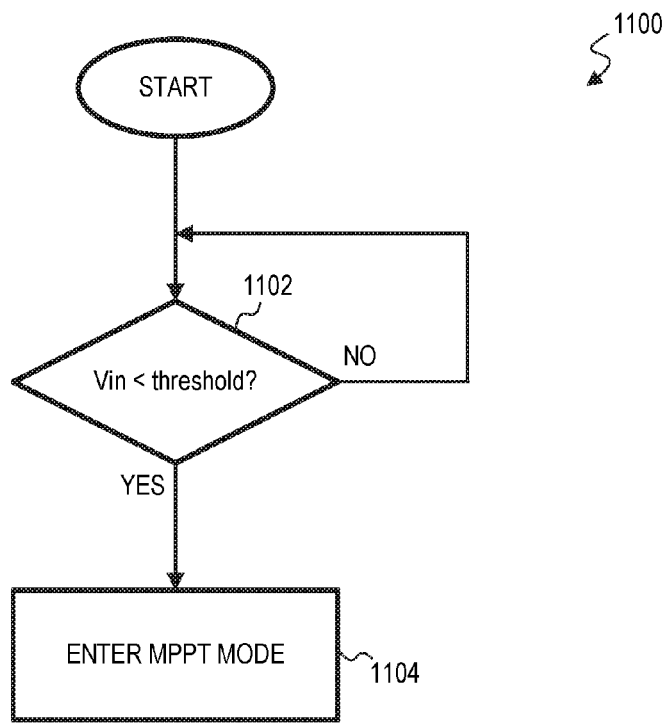
FIG. 11 illustrates another method of determining when to exit a fixed duty cycle operating mode, according to an embodiment.

FIG. 11 illustrates a method 1100 of determining when to exit the fixed duty cycle operating mode. Method 1100 is executed, for example, as part of step 708 of method 700. However, method 1100 is not limited to use with method 700, but instead could be used to determine when to exit the fixed duty cycle operating mode in other situations. Additionally, step 708 is not limited to use with method 1100.

Method 1100 begins with a decision step 1102 of determining whether a voltage across the input port, or a voltage that is a function of the input port voltage, has fallen below a threshold value. The threshold value is typically chosen to be zero, or a value close to zero, so that step 1102 detects when the input port voltage, or a related voltage, is substantially zero. Zero input port voltage may indicate conclusion of photovoltaic device testing. For example, input port voltage will be essentially zero at the conclusion of flash testing when a load is swept from open circuit to closed circuit. As another example, input port voltage may drop to near zero after removal of an EL test current source. If the voltage is not less than the threshold value, step 1102 repeats; otherwise, the method proceeds to enter MPPT mode in step 1104.

One example of steps 1102, 1104 is control subsystem 338 comparing input port voltage Vin or power supply rail Vcc voltage to a threshold value and entering MPPT mode if the voltage is less than the threshold value. In some alternate embodiments, however, the method enters an alternative operating mode at step 1104, such as the bypass mode described above, instead of the MPPT mode.

Flash testing may be difficult to detect in some applications, since current flows through the photovoltaic device in its normal direction during flash testing. Accordingly, some embodiments of controller 302 are adapted to remain in their fixed duty cycle operating mode after conclusion of EL testing, to allow subsequent flash testing while remaining in the fixed duty cycle operating mode. The fixed duty cycle mode could also be entered in embodiments detecting negative output current, such as discussed above with respect to FIG. 9, by initially driving the output port with a reverse current.

Figure 12:
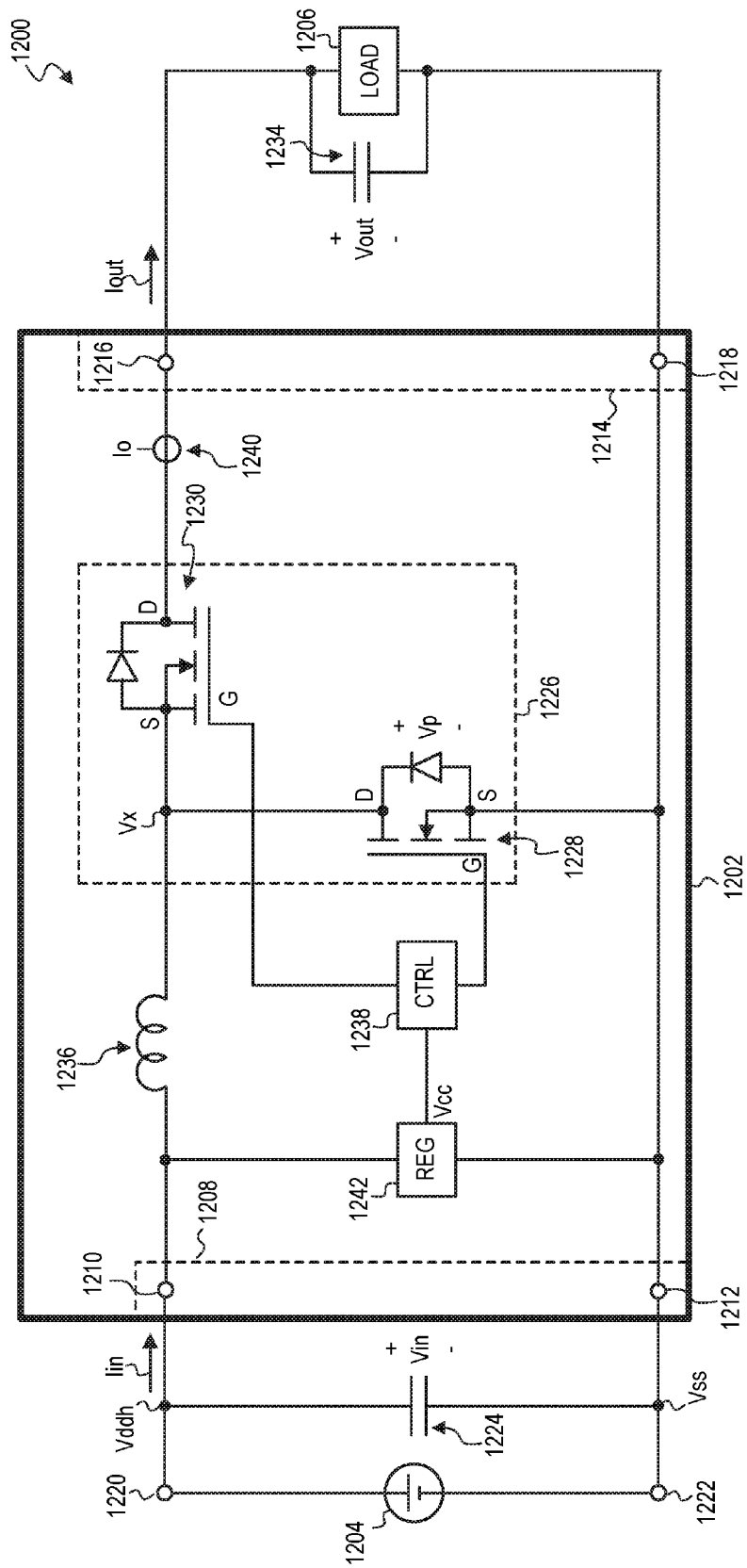
FIG. 12 illustrates another photovoltaic electric power system including a MPPT controller including at least two operating modes, according to an embodiment.

Fixed duty cycle operating modes may also be implemented in MPPT controller applications having a topology other than a buck-type topology, such as a boost topology or a buck-boost topology. For example, FIG. 12 illustrates an electric power system 1200 including an MPPT controller 1202 electrically coupled between a photovoltaic device 1204 and a load 1206. MPPT controller 1202 is similar to MPPT controller 302, but is configured to support a boost topology, instead of a buck topology.

MPPT controller 1202 includes an input port 1208 including input terminals 1210, 1212 and an output port 1214 including output terminals 1216, 1218. A positive terminal 1220 of photovoltaic device 1204 is electrically coupled to input terminal 1210, and a negative terminal 1222 of photovoltaic device 1204 is electrically coupled to input terminal 1212, such that photovoltaic device 1204 is electrically coupled in series with input port 1208. Terminals 1210, 1220 form part of a positive power node or rail (Vddh), and terminals 1212, 1222 form part of a reference power node or rail (Vss). Photovoltaic device 1204 is, for example, a photovoltaic module including a plurality of interconnected photovoltaic cells, a single junction photovoltaic cell, or a multi junction photovoltaic cell.

System 1200 optionally includes one or more input capacitors 1224 electrically coupled across input port 1208. Capacitors 1224 helps supply the ripple component of controller 1202 input current Iin, thereby helping minimize the magnitude of ripple current flowing through photovoltaic device 1204. MPPT controller 1202 further includes energy storage inductance 1236 electrically coupled between input port terminal 1210 and a switching node Vx. Energy storage inductance 1236 may include one or more discrete inductors, as shown.

MPPT controller 1202 further includes a switching circuit 1226 electrically coupled between energy storage inductance 1236 and output port 1214. Switching circuit 1226 includes a control switching device 1228 electrically coupled between switching node Vx and input and output port terminals 1212, 1218, and a freewheeling switching device 1230 electrically coupled between switching node Vx and output terminal 1216. Output terminal 1218 is electrically coupled to input terminal 1212. Although switching devices 1228, 1230 are shown as being N-channel enhancement mode field effect transistors, switching devices 1228, 1230 could be replaced with alternative switching devices without departing from the scope hereof.

Load 1206 is electrically coupled in series with output port 1214. Load 1206 includes, for example, an inverter or a battery charger. One or more output capacitors 1234 are electrically coupled across load 1206 to absorb the ripple component of output current Tout. Capacitors 1234 are optionally omitted, though, in embodiments where load 1206 includes significant capacitance, such as in embodiments where load 1206 is an inverter with significant input capacitance.

MPPT controller 1202 further includes a control subsystem 1238. Switching circuit 1226, energy storage inductance 1236, and capacitors 1234 collectively form a boost converter controlled by control subsystem 1238. In an MPPT operating mode of controller 1202, control subsystem 1238 is adapted to control switching of switching circuit 1226 such that the boost converter transfers power from input port 1208 to output port 1214, thereby transferring power from photovoltaic device 1204 to load 1206. Specifically, control subsystem 1238 causes control switching device 1228 to repeatedly switch between its conductive and non-conductive states, typically at a frequency of at least 100 kilohertz, to transfer power from input port 1208 to output port 1214. Switching device 1228 is referred to as the "control" switching device because the ratio of input voltage Vin to output voltage Vout across load 1206 is a function of switching device 1228's duty cycle.

Control subsystem 1238 also controls switching of freewheeling switching device 1230 such that it performs a freewheeling function, or in other words, such that freewheeling switching device 1230 provides a path for current flowing through energy storage inductance 1236 when control switching device 1228 is in its non-conductive state.

MPPT controller 1202 optionally further includes a current reconstructor subsystem 1240 adapted to generate a signal Io representing output current Tout flowing out of output port 1214. Additionally, in some embodiments, MPPT controller 1202 further includes a voltage regulator 1242 which generates a "housekeeping" power supply node or rail (Vcc) from Vddh/Vss. Vcc is used, for example, to at least partially power control subsystem 1238, as shown.

Although input capacitors 1224 and output capacitors 1234 are shown as being external to MPPT controller 1202, one or more of these components could be integrated within controller 1202 without departing from the scope hereof. Additionally, in cases where energy storage inductance 1236 is one or more discrete inductors, the inductors could be disposed external to controller 1202. Furthermore, some or all of MPPT controller 1202 is implemented in a common integrated circuit in certain embodiments, such as to promote small size, small parasitic impedance between components, and fast signal transfer time. In these embodiments, the integrated circuit is optionally co-packaged with photovoltaic device 1204 to promote small system size and minimal impedance between device 1204 and controller 1202. However, MPPT controller 1202 is not limited to an integrated circuit implementation and could instead be formed partially or completely from discrete components.

MPPT controller 1202 has at least two operating modes, namely an MPPT operating mode and a fixed duty cycle mode. In the MPPT operating mode, control subsystem 1238 causes control switching device 1228 to repeatedly switch between its conductive and non-conductive states to at least substantially maximize an amount of power extracted from photovoltaic device 1204 and delivered to load 1206. For example, in some embodiments, control subsystem 1238 maximizes power into input port 1208, thereby maximizing power extracted from photovoltaic device 1204. In some other embodiments, control subsystem 1238 maximizes power out of output port 1214, which effectively maximizes power extracted from photovoltaic device 1204, since power out of output port 1214 is the same as power into input port 1208, neglecting losses in MPPT controller 1202.

In the fixed duty cycle operating mode, control subsystem 1238 causes MPPT controller 1202 to provide a fixed DC transformation between input and output ports 1208, 1214 to facilitate testing of photovoltaic device 1204 or reverse current operation, in a manner similar to that discussed above with respect to MPPT controller 302 (FIG. 3). Specifically, control subsystem 1238 causes control switching device 1228 to operate at a fixed duty cycle to achieve a fixed DC transformation between input port 1208 and output port 1214. However, in contrast to MPPT controller 302, control subsystem 1238 typically causes freewheeling switching device 1230, instead of control switching device 1228, to operate at a large duty cycle, such as at least ninety percent duty cycle.

Control subsystem 1238 is adapted, for example, to determine when to operate controller 1202 in its fixed duty cycle mode, and when to switch controller 1202 from its fixed duty cycle to MPPT mode, using one or more techniques similar to those discussed above with respect to MPPT controller 302. For example, in some embodiments, control subsystem 1238 is adapted to determine that fixed duty cycle mode operation is appropriate if voltage is present across output port 1214 at start-up, or if output current Iout has a negative value, in a manner similar to that discussed above with respect to FIGS. 8 and 9. As another example, in some embodiments, control subsystem 1238 is adapted to exit the fixed duty cycle operating mode after expiration of a predetermined amount of time, or if voltage across input port 1208 falls below a threshold value, in a manner similar to that discussed above with respect to FIGS. 10 and 11.

In buck-boost topology applications, the control switching device is operated at a fixed duty cycle, such as around fifty percent duty cycle, in a fixed duty cycle operating mode, to achieve a fixed DC transformation.

Figure 13:
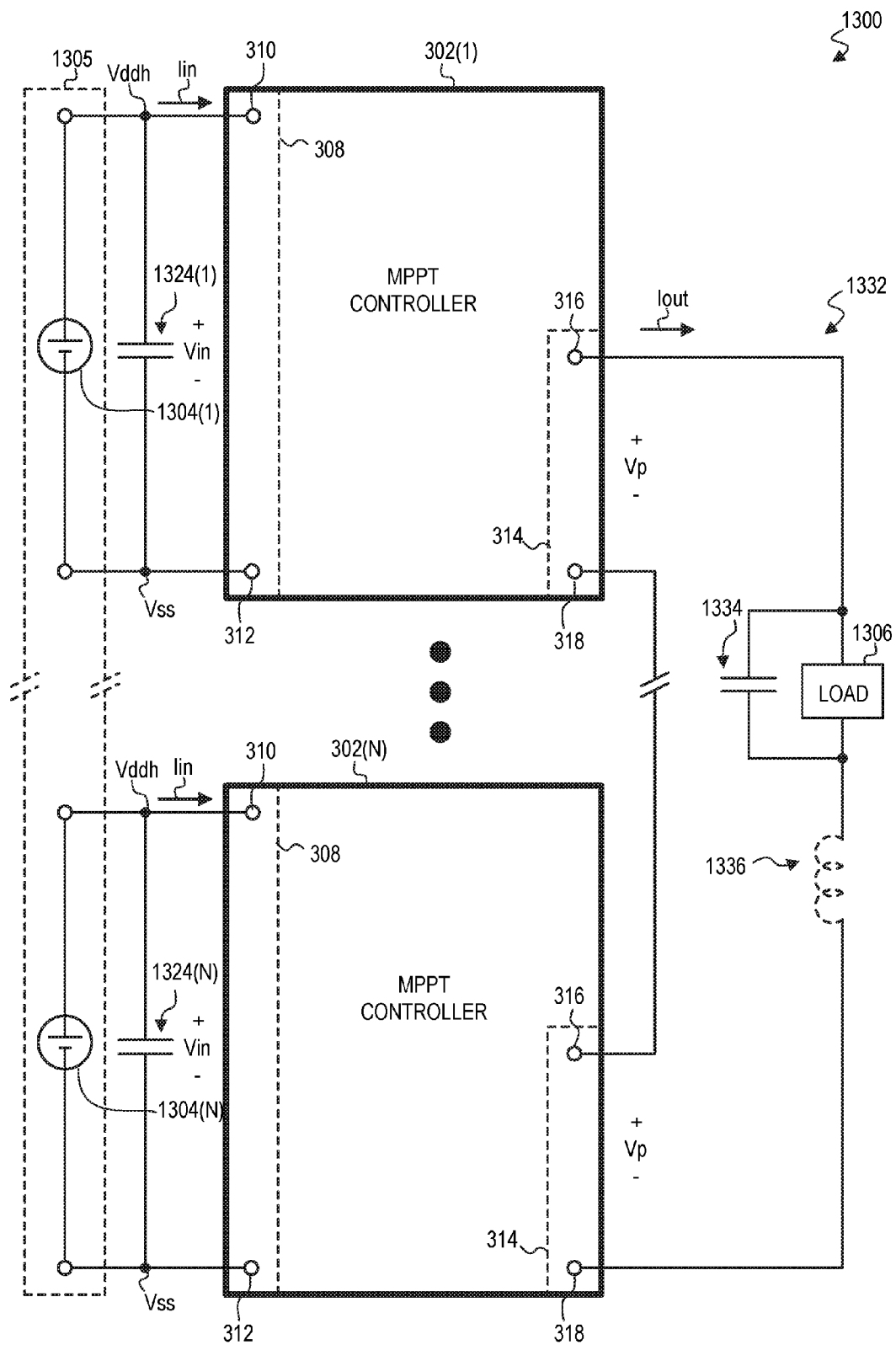
FIG. 13 illustrates a photovoltaic electric power system including multiple MPPT controllers, where each MPPT controller includes at least two operating modes, according to an embodiment.

Use of MPPT controllers including fixed duty cycle modes is not limited to photovoltaic electric power systems with a single photovoltaic device and MPPT controller. For example, FIG. 13 illustrates a photovoltaic electric power system 1300 including N instances of MPPT controller 302 in a photovoltaic application, where N is an integer greater than one. In this document, specific instances of an item may be referred to by use of a numeral in parentheses (e.g., MPPT controller 302(1)) while numerals without parentheses refer to any such item (e.g., MPPT controllers 302). Some of the constituent blocks of MPPT controllers 302 are not shown in FIG. 13 to promote illustrative clarity.

The input port 308 of each MPPT controller 302 is electrically coupled to a respective photovoltaic device 1304 of a common photovoltaic module 1305. Photovoltaic devices 1304 are, for example, single photovoltaic cells or groups of electrically interconnected photovoltaic cells. However, the configuration of photovoltaic devices 1304 can be varied without departing from the scope hereof. For example, in some alternate embodiments, photovoltaic devices 1304 are discrete photovoltaic devices and are not part of a common module. As another example, in some other embodiments, two or more photovoltaic devices 1304 have different configurations. A respective input capacitor 1324 is also electrically coupled across each input port 308.

Output ports 314 of MPPT controllers 302 are electrically coupled in series with a load 1306. One or more output capacitors 1334 are electrically coupled across load 1306 and are shared by each of the N MPPT controllers 1302. However, in some alternate embodiments, load 1306 contains significant capacitance and capacitors 1334 are therefore omitted. Additionally, in some other alternate embodiments, each MPPT controller 302 has a respective capacitor (not shown) electrically coupled across its output port 314.

MPPT controllers 302 use interconnection inductance 1336 of an output circuit 1332 electrically coupling switching circuits 326 to load 1306 as energy storage inductance. Although this interconnection inductance is symbolically shown as a single element, it is actually distributed along a loop forming output circuit 1332. Some alternate embodiments, however, include one or more discrete inductors (not shown) electrically coupled in series with output circuit 1332. For example, each MPPT controller 302 is typically required to have a respective discrete inductor electrically coupled in series with its output port 314 in embodiments where each MPPT controller 302 has a respective capacitor electrically coupled across its output port 314.

Each MPPT controller 302 essentially operates in the same manner as discussed with respect to electric power systems including a single MPPT controller 302 instance. For example, in an MPPT operating mode, each MPPT controller 302 maximizes power extracted from its respective photovoltaic device 1304. In a fixed duty cycle operating mode, on the other hand, each MPPT controller operates such that its control switching device has a fixed duty cycle. Flash testing may be performed, for example, by replacing load 1306 with a variable load, and sweeping load resistance while exposing photovoltaic devices 1304 to a light source of known intensity. EL testing may be performed by replacing load 1306 with a test current source, and driving a test current into output ports 314 in a direction opposite of normal output current Iout.

Figure 14:
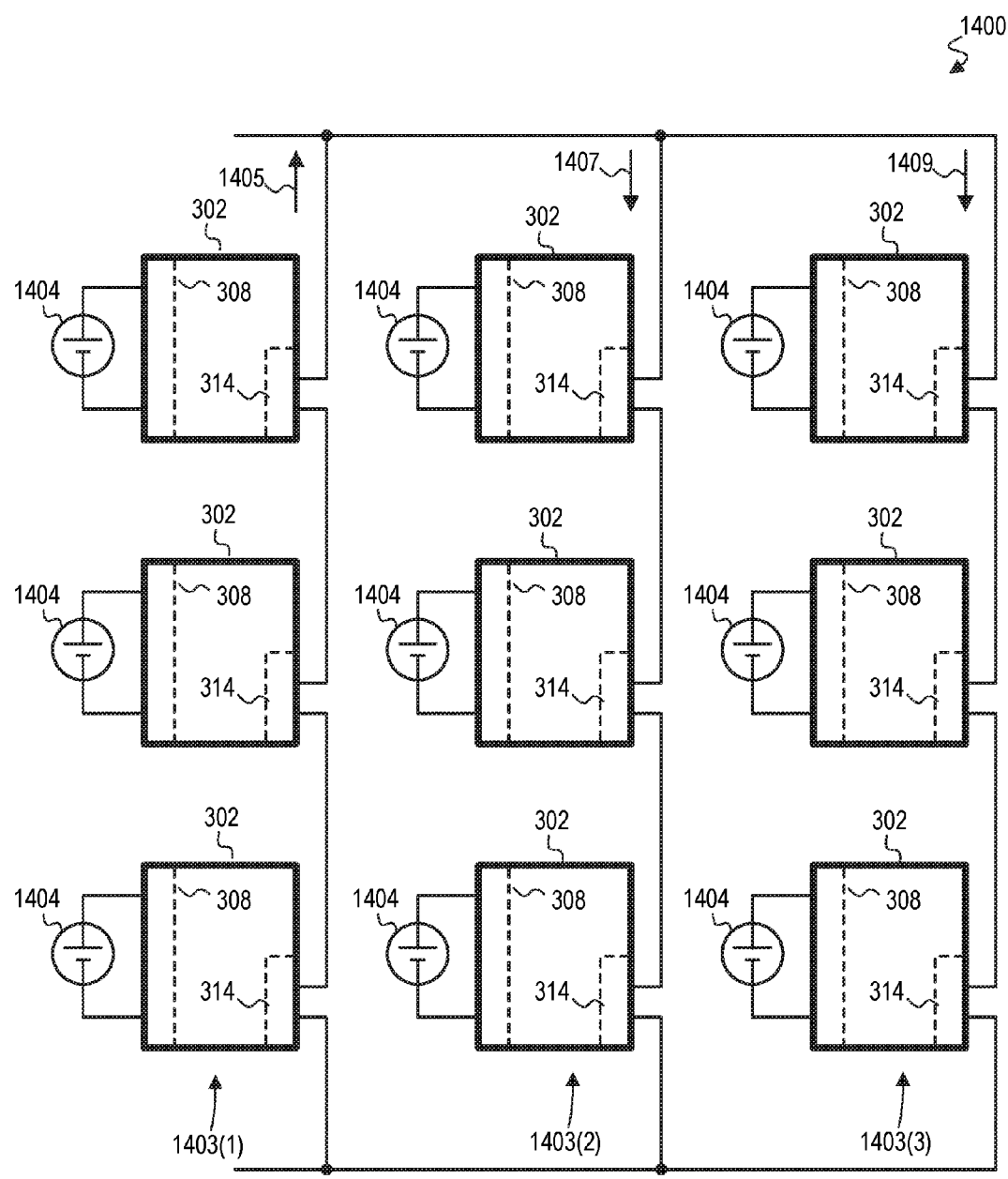
FIG. 14 illustrates a photovoltaic electric power system including three parallel coupled strings of the MPPT controller of FIG. 3, according to an embodiment.

Reverse current mode operation may present current sharing challenges in applications with two or more MPPT controllers 302 electrically coupled in parallel. For example, FIG. 14 illustrates a photovoltaic electric power system 1400 including three parallel coupled strings 1403, where each string includes three instances of MPPT controller 302 with output ports 314 electrically coupled in series. A respective photovoltaic device 1404 is electrically coupled to each controller 302's input port 308. Only input and output ports 308, 314 of controllers 302 are shown for illustrative clarity.

Consider a scenario where string 1403(1) is producing a larger photo-generated current than either string 1403(2) or 1403(3), such as due to partial shading of strings 1403(2), 1403(3). Forward current 1405 of strong string 1403(1) will forward bias weaker strings 1403(2), 1403(3), such that reverse currents 1407, 1409 flow through strings 1403(2), 1403(3), respectively. If strings 1403(2), 1403(3) have the same current-voltage characteristics, the magnitude of reverse currents 1407, 1409 will be the same. If strings 1403(2), 1403(3) have different current-voltage characteristics, reverse currents 1407, 1409 will have different magnitudes, such that strings 1403(2), 1403(3) do not equally share reverse current.

Figure 1:
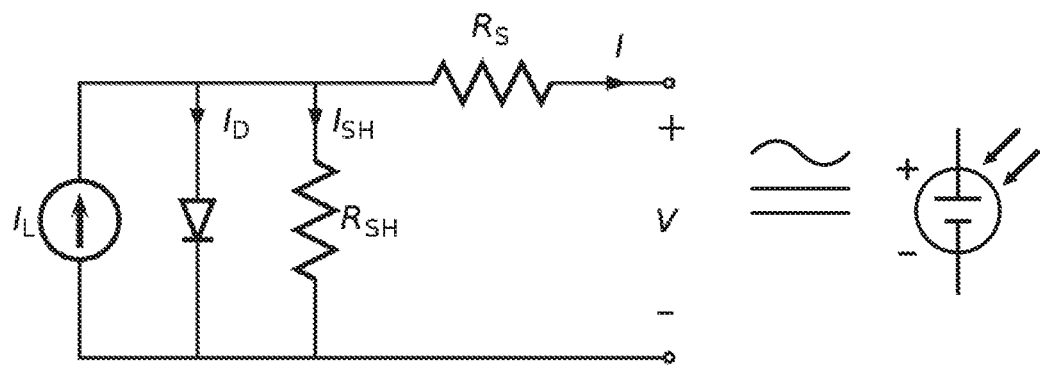
FIG. 1 shows one model of a photovoltaic cell.
Figure 2:
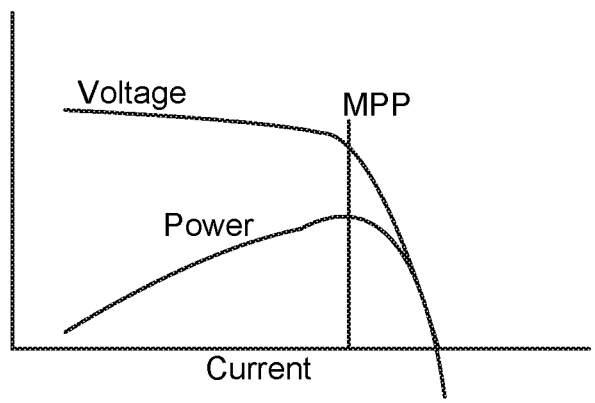
FIG. 2 shows a graph of voltage and power as a function of current for one photovoltaic cell.

The reverse current imbalance can be large due to the current-voltage characteristics of photovoltaic devices 1404. In particular, a photovoltaic cell has a reverse current-voltage characteristic similar to a diode, as suggested by the FIG. 1 model, causing cell voltage to be relatively insensitive to current magnitude, once the cell is conducting reverse current. Thus, any voltage imbalance that might exist between two stand-alone cells, when biased with the same reverse magnitude current magnitude, may result in a large current imbalance when the cells are parallel coupled.

Figure 15:
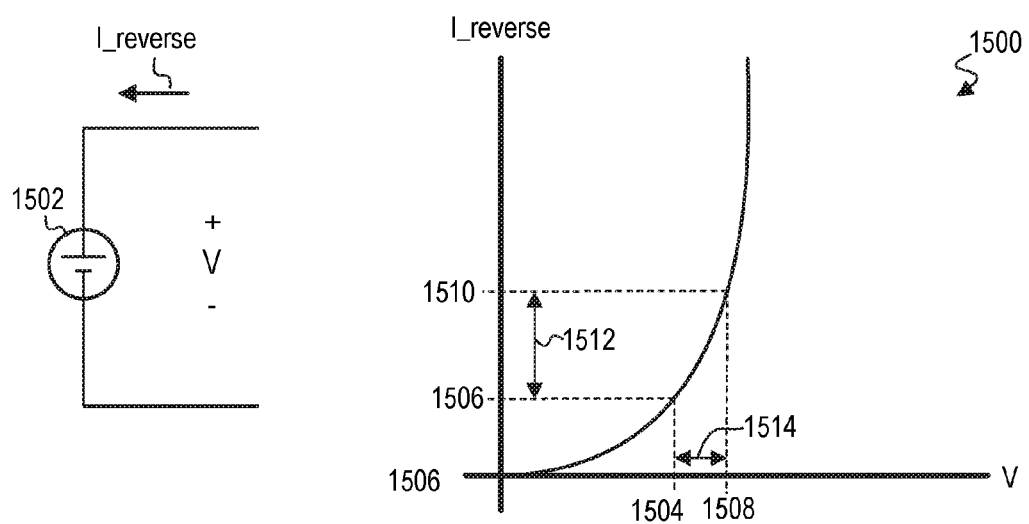
FIG. 15 shows a graph of reverse current versus voltage for a photovoltaic cell.

For example, FIG. 15 shows a graph 1500 of reverse current versus voltage for a photovoltaic cell 1502. Assume that cell 1502 operates with a voltage 1504 when biased with a reverse current 1506. Now, assume cell 1502 is electrically coupled in parallel with another photovoltaic cell (not shown) having different current-voltage characteristics, such that cell 1502 must operate at voltage 1508 due to the parallel connection. Reverse current magnitude jumps to 1510, resulting in a large change 1512 in reverse current magnitude to compensate for a small change 1514 in voltage magnitude. Thus, small differences in current-voltage characteristics between parallel connected photovoltaic devices can cause significant reverse current imbalance in the devices.

Unequal sharing of reverse current may cause one string to experience excessive reverse current magnitude, which may potentially damage controllers 302 and/or photovoltaic devices 1404 of the string. Additionally, strings 1403 are typically fused for safety reasons, and excessive reverse current magnitude in a string may blow the string's fuse, thereby causing the string to be off-line and not produce energy, until the fuse is replaced.

Accordingly, certain embodiments of MPPT controller 302 are adapted to operate in a third operating mode, sometimes referred to as a reverse current operating mode, under reverse current conditions. In these embodiments, control subsystem 338 is adapted to cause control switching device 328 to repeatedly switch between its conductive and non-conductive states at duty cycle which maintains a predetermined output current-voltage characteristic of the controller, as seen when looking into output port 314 from a load. Operating each MPPT controller such that it has a common output current-voltage characteristic allows each string to have a common current-voltage characteristic, thereby promoting equal current sharing among strings 1403 in reverse current operation. Control subsystem 308 causes MPPT controller 302 to enter the reverse current operating mode, for example, when magnitude of signal Io is less than or equal to a threshold value, where the threshold value represents negative or very small output current.

Figure 16:
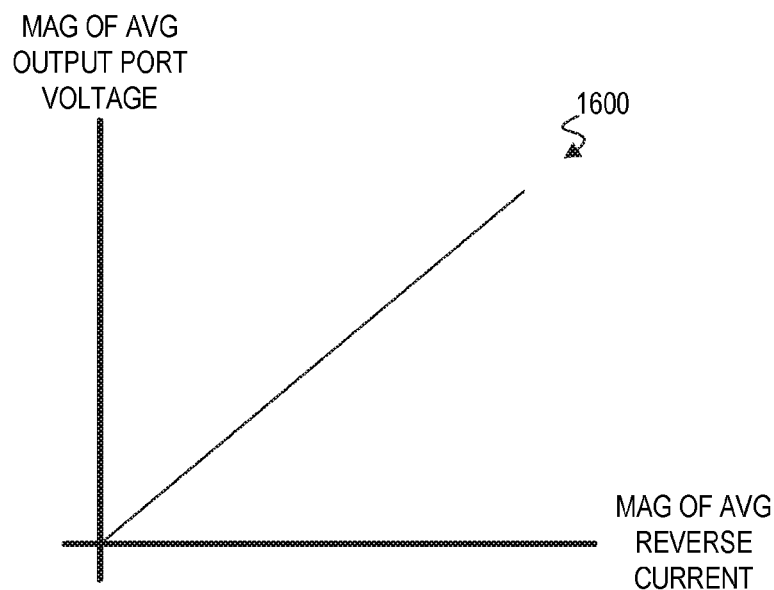
FIG. 16 shows one example of a linear output current-voltage characteristic, according to an embodiment.
Figure 17:
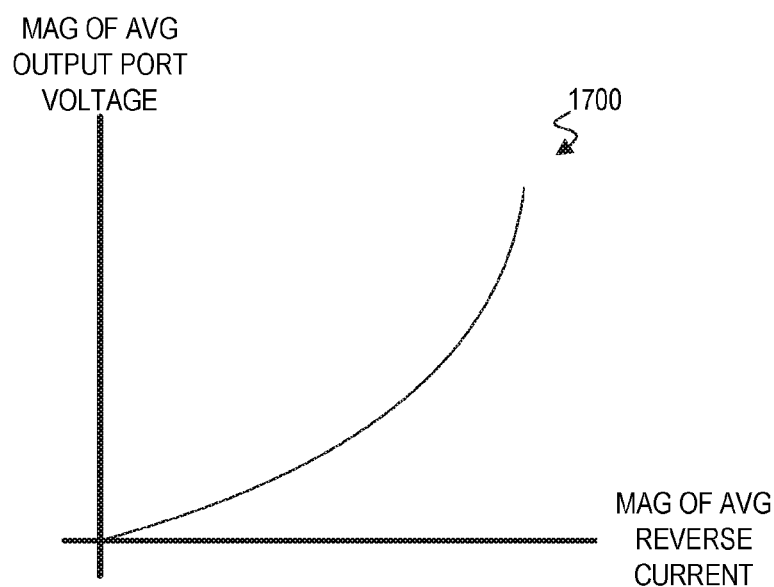
FIG. 17 shows one example of a non-linear output current-voltage characteristic, according to an embodiment.

In some embodiments supporting the reverse current operating mode, the predetermined output current-voltage characteristic is linear, such that the magnitude of average voltage across output port 314 changes linearly in response to a change in average current into output port 314. FIG. 16 shows one example of a linear output current-voltage characteristic 1600. In some other embodiments supporting the reverse current operating mode, the predetermined output current-voltage characteristic is non-linear, such that the magnitude of average voltage across output port 314 changes non-linearly in response to a change in average current into output port 314. FIG. 17 shows one example of a non-linear output current-voltage characteristic 1700.

The fact that characteristics 1600, 1700 have relatively large effective resistances, i.e., the value of voltage over current, also promotes current sharing. In particular, resistance of a string results in negative feedback because the resistance causes string voltage to rise as current magnitude increases, thereby reducing the current magnitude required to achieve a given voltage. Non-linear characteristic 1700 has a particularly large effective resistance at large current magnitudes, thereby potentially resulting large negative feedback at large current magnitudes. A reverse biased photovoltaic cell, in contrast, has a relatively small effective resistance, resulting in little negative feedback in parallel connection applications.

A reverse current operating mode is optionally implemented in MPPT controller 1202 (FIG. 12) in a manner similar to that of MPPT controller 302.

Combinations of Features

Features described above as well as those claimed below may be combined in various ways without departing from the scope hereof. The following examples illustrate some possible combinations:

(A1) A method for operating a maximum power point tracking (MPPT) controller including a switching circuit adapted to transfer power between an input port and an output port may include the steps of: (a) in a first operating mode of the MPPT controller, causing a first switching device of the switching circuit to operate at a fixed duty cycle; and (b) in a second operating mode of the MPPT controller, causing a control switching device of the switching circuit to repeatedly switch between its conductive and non-conductive states to maximize an amount of power extracted from a photovoltaic device electrically coupled to the input port.

(A2) In the method denoted as (A1), the first switching device may include at least one of the control switching device of the switching circuit and a freewheeling switching device of the switching circuit.

(A3) In either of the methods denoted as (A1) or (A2), the fixed duty cycle may be at least ninety percent duty cycle.

(A4) In either of the methods denoted (A1) or (A2), the fixed duty cycle may be one hundred percent duty cycle.

(A5) Any of the methods denoted as (A1) through (A4) may further include operating the MPPT controller in its first operating mode in response to determining that a magnitude of a signal representing voltage across the output port is greater than a first threshold value, prior to switching circuit operation at start-up of the MPPT controller.

(A6) Any of the methods denoted as (A1) through (A5) may further include causing the switching circuit to operate in its non-conductive state until a magnitude of a voltage on a power supply rail of the MPPT controller exceeds a predetermined value.

(A7) The method denoted (A6) may further include powering the power supply rail of the MPPT controller from the output port, in the first operating mode of the MPPT controller.

(A8) In the method denoted as (A7), the first switching device may include a first transistor, and the method may include electrically coupling current to the power supply rail of the MPPT controller using a body diode of the first transistor.

(A9) Any of the methods denoted as (A1) through (A8) may further include operating the MPPT controller in its first operating mode in response to determining that a signal representing current flowing out of the output port is less than or equal to a second threshold value.

(A10) In the method denoted as (A9), the second threshold value may represent that current is flowing out of the output port in a negative direction.

(A11) The method denoted as (A10) may further include continuing to operate the MPPT controller in its first operating mode after a magnitude of current flowing out of the output port falls to zero.

(A12) Any of the methods denoted as (A1) through (A11) may further include operating the MPPT controller in its first operating mode in response to an external signal.

(A13) Any of the methods denoted as (A1) through (A12) may further include operating the MPPT controller in its first operating mode each time the MPPT controller starts up.

(A14) Any of the methods denoted as (A1) through (A13) may further include causing a duty cycle of the first switching device to ramp up to the fixed duty cycle when beginning to operate the MPPT controller in its first operating mode.

(A15) Any of the methods denoted as (A1) through (A14) may further include switching from the first operating mode to a different operating mode of the MPPT controller after a predetermined amount of time.

(A16) Any of the methods denoted as (A1) through (A15) may further include switching from the first operating mode to a different operating mode of the MPPT controller when a first voltage signal falls below a third threshold value.

(A17) In the method denoted as (A16), the first voltage signal may be a function of a voltage across the input port.

(A18) In any of the methods denoted as (A15) through (A17), the different operating mode may be the second operating mode of the MPPT controller.

(A19) Any of the methods denoted as (A1) through (A18) may further include causing the control switching device to repeatedly switch between its conductive and non-conductive states at a duty cycle which maintains a predetermined output current-voltage characteristic of the MPPT controller, in a third operating mode of the MPPT controller.

(A20) The method denoted as (A19) may further include operating the MPPT controller in its third operating mode in response to determining that a signal representing current flowing out of the output port is less than or equal to a fourth threshold value, where the fourth threshold value may represent that current is flowing out of the output port in a negative direction.

(A21) In either of the methods denoted as (A19) or (A20), the predetermined output current-voltage characteristic of the MPPT controller may be linear such that magnitude of average voltage across the output port changes linearly in response to a change in magnitude of average current flowing into the input port.

(A22) In either of the methods denoted as (A19) or (A20), the predetermined output current-voltage characteristic of the MPPT controller may be non-linear such that magnitude of average voltage across the output port changes non-linearly in response to a change in magnitude of average current flowing into the input port.

(B1) A method for testing a photovoltaic device electrically coupled to an input port of a maximum power point tracking (MPPT) controller, where the MPPT controller includes a switching circuit adapted to transfer power between the input port and an output port of the MPPT controller, may include the steps of: (a) driving a test current into the output port of the MPPT controller; (b) detecting presence of the test current; and (c) in response to detecting presence of the test current, causing the switching circuit to provide a path for the test current from the output port to the photovoltaic device.

(B2) In the method denoted as (B1), the step of causing the switching circuit to provide a path for the test current from the output port to the photovoltaic device may include causing a switching device of the switching circuit to operate at a fixed duty cycle.

(B3) In the method denoted as (B2), the fixed duty cycle may be at least ninety percent duty cycle.

(B4) In the method denoted as (B2), the fixed duty cycle may be one hundred percent duty cycle.

(B5) In any of the methods denoted as (B1) through (B4), the step of causing the switching circuit to provide a path for the test current from the output port to the photovoltaic device may include causing the MPPT controller to act as a fixed direct current transformer electrically coupling the test current to the photovoltaic device.

(B6) In any of the methods denoted as (B1) through (B5), the step of detecting presence of the test current may include detecting presence of current flowing into the output port from an external source.

(B7) In any of the methods denoted as (B1) through (B6), the step of detecting presence of the test current may include detecting voltage across the output port of the switching circuit.

(B8) In the method denoted as (B7), the step of detecting voltage across the output port of the switching circuit may include comparing a signal representing the voltage across the output port to a threshold value.

(C1) A maximum power point tracking (MPPT) controller may include an input and an output port, a switching circuit adapted to transfer power between the input and output ports, and a control subsystem. The control subsystem may be adapted to (a) cause a first switching device of the switching circuit to operate at a fixed duty cycle, in a first operating mode of the MPPT controller; and (b) cause a control switching device of the switching circuit to repeatedly switch between its conductive and non-conductive states to maximize an amount of electric power extracted from a photovoltaic device electrically coupled to the input port, in a second operating mode of the MPPT controller.

(C2) In the MPPT controller denoted as (C1), the first switching device may include at least one of the control switching device of the switching circuit and a freewheeling switching device of the switching circuit.

(C3) In either of the MPPT controllers denoted as (C1) or (C2), the fixed duty cycle may be at least ninety percent duty cycle.

(C4) In either of the MPPT controllers denoted as (C1) or (C2), the fixed duty cycle may be one hundred percent duty cycle.

(C5) In any of the MPPT controllers denoted as (C1) through (C4), the control subsystem may be further adapted to: (a) compare a magnitude of a signal representing voltage across the output port to a first threshold value, prior to switching circuit operation at start-up of the MPPT controller; and (b) operate the MPPT controller in its first operating mode in response to determining that the magnitude of the signal representing voltage across the output port is greater than the first threshold value.

(C6) In any of the MPPT controllers denoted as (C1) through (C5), the control subsystem may be further adapted to cause the switching circuit to operate in its non-conductive state until a magnitude of a voltage on a power supply rail of the MPPT controller exceeds a predetermined value.

(C7) In the MPPT controller denoted as (C6), the MPPT controller may be configured such that the power supply rail of the MPPT controller is powered from the output port, in the first operating mode of the MPPT controller.

(C8) In any of the MPPT controllers denoted as (C1) through (C7): (a) the control switching device may be electrically coupled between a first terminal of the input port and a first terminal of the output port; (b) the switching circuit may further include a freewheeling device electrically coupled between the first terminal of the output port and a second terminal of the output port, where the freewheeling device is adapted to provide a path for current flowing between the first and second terminals of the output port when the control switching device is in its non-conductive state; (c) the first switching device may be the control switching device; and (d) the first terminal of the output port may be electrically coupled to a switching node.

(C9) In the MPPT controller denoted as (C8), the control switching device may be a control transistor, where the control transistor includes a body diode having an anode electrically coupled to the switching node and a cathode electrically coupled to the first terminal of the input port.

(C10) In any of the MPPT controllers denoted as (C1) through (C9), the control subsystem may be further adapted to: (a) compare a signal representing current flowing out of the output port to a second threshold value; and (b) operate the MPPT controller in its first operating mode in response to determining that the signal representing current flowing out of the output port is less than or equal to the second threshold value.

(C11) In the MPPT controller denoted as (C10), the second threshold value may represent that current is flowing out of the output port in a negative direction.

(C12) In the MPPT controller denoted as (C11), the control subsystem may be further adapted to continue to operate the MPPT controller in its first operating mode after a magnitude of current flowing out of the output port falls to zero.

(C13) In any of the MPPT controllers denoted as (C1) through (C12), the control subsystem may be further adapted to operate the MPPT controller in its first operating mode in response to an external signal.

(C14) In any of the MPPT controllers denoted as (C1) through (C13), the control subsystem may be further adapted to operate the MPPT controller in its first operating mode each time the MPPT controller starts up.

(C15) In any of the MPPT controllers denoted as (C1) through (C14), the control subsystem may be further adapted to cause a duty cycle of the first switching device to ramp up to the fixed duty cycle when beginning to operate the MPPT controller in its first operating mode.

(C16) In any of the MPPT controllers denoted as (C1) through (C15), the control subsystem may be further adapted to cause to the MPPT controller to switch from its first operating mode to a different operating mode after a predetermined amount of time.

(C17) In any of the MPPT controllers denoted as (C1) through (C16), the control subsystem may be further adapted to: (a) compare a first voltage signal to a third threshold value, the first voltage signal being a function of a voltage across the input port; and (b) cause the MPPT controller to switch from its first operating mode to a different operating mode of the MPPT controller, when the first voltage signal falls below the third threshold value.

(C18) In either of the MPPT controllers denoted as (C16) or (C17), the different operating mode may be the second operating mode of the MPPT controller.

(C19) In any of the MPPT controllers denoted as (C1) through (C18), the control subsystem may be further adapted to cause the control switching device to repeatedly switch between its conductive and non-conductive states at a duty cycle which maintains a predetermined output current-voltage characteristic of the MPPT controller, in a third operating mode of the MPPT controller.

(C20) In the MPPT controller denoted as (C19), the control subsystem may be further adapted to: (a) compare a signal representing current flowing out of the output port to a fourth threshold value; and (b) operate the MPPT controller in its third operating mode in response to determining that the signal representing current flowing out of the output port is less than or equal to the fourth threshold value.

(C21) In the MPPT controller denoted as (C20), the fourth threshold value may represent that current is flowing out of the output port in a negative direction.

(C22) In any of the MPPT controllers denoted as (C19) through (C21), the predetermined output current-voltage characteristic of the MPPT controller may be linear such that magnitude of average voltage across the output port changes linearly in response to a change in magnitude of average current flowing into the input port.

(C23) In any of the MPPT controllers denoted as (C19) through (C21), the predetermined output current-voltage characteristic of the MPPT controller may be non-linear such that magnitude of average voltage across the output port changes non-linearly in response to a change in magnitude of average current flowing into the input port.

Changes may be made in the above methods and systems without departing from the scope hereof. For example, N-channel field effect transistors could be replaced with P-channel field effect transistors, or vice versa, with appropriate changes to associated circuitry. As another example, field effect transistors could be replaced with bipolar junction transistors, with appropriate changes to associated circuitry. It should thus be noted that the matter contained in the above description and shown in the accompanying drawings should be interpreted as illustrative and not in a limiting sense. The following claims are intended to cover generic and specific features described herein, as well as all statements of the scope of the present method and system, which, as a matter of language, might be said to fall therebetween.

What is claimed is:

1. A method for testing a photovoltaic device electrically coupled to an input port of a maximum power point tracking (MPPT) controller, wherein the MPPT controller includes a switching circuit adapted to transfer power between the input port and an output port of the MPPT controller, the method comprising the steps of:
   driving a test current into the output port of the MPPT controller;
   detecting presence of the test current; and
   in response to detecting presence of the test current, causing the switching circuit to provide a path for the test current from the output port to the photovoltaic device.

2. The method of claim 1, the step of causing the switching circuit to provide a path for the test current from the output port to the photovoltaic device comprising causing a switching device of the switching circuit to operate at a fixed duty cycle.

3. The method of claim 2, the fixed duty cycle being at least ninety percent duty cycle.

4. The method of claim 3, the fixed duty cycle being one hundred percent duty cycle.

5. The method of claim 1, the step of causing the switching circuit to provide a path for the test current from the output port to the photovoltaic device comprising causing the MPPT controller to act as a fixed direct current transformer electrically coupling the test current to the photovoltaic device.

6. The method of claim 1, the step of detecting presence of the test current comprising detecting presence of current flowing into the output port from an external source.

7. The method of claim 1, the step of detecting presence of the test current comprising detecting voltage across the output port of the switching circuit.

8. The method of claim 7, the step of detecting voltage across the output port of the switching circuit comprising comparing a signal representing the voltage across the output port to a threshold value.

* * * * *